US012550975B2

(12) United States Patent
Hoeck, III et al.

(10) Patent No.: US 12,550,975 B2
(45) Date of Patent: Feb. 17, 2026

(54) MODULAR FOOTWEAR AND METHODS OF MAKING THE SAME

(71) Applicant: adidas AG, Herzogenaurach (DE)

(72) Inventors: John Hoeck, III, Lake Oswego, OR (US); Stephen P. Dobson, Portland, OR (US); Christian Manuel Arias Delgado, Portland, OR (US); Niccolo Dambrosio, Portland, OR (US); Theodore James Cotton, Milwaukie, OR (US)

(73) Assignee: adidas AG, Herzogenaurach (DE)

( * ) Notice: Subject to any disclaimer, the term of this patent is extended or adjusted under 35 U.S.C. 154(b) by 0 days.

(21) Appl. No.: 18/680,811

(22) Filed: May 31, 2024

(65) Prior Publication Data

US 2025/0366564 A1  Dec. 4, 2025

(51) Int. Cl.
*A43B 13/16* (2006.01)
*B33Y 10/00* (2015.01)
*B33Y 70/00* (2020.01)

(52) U.S. Cl.
CPC .............. *A43B 13/16* (2013.01); *B33Y 10/00* (2014.12); *B33Y 70/00* (2014.12)

(58) Field of Classification Search
None
See application file for complete search history.

(56) References Cited

U.S. PATENT DOCUMENTS

| 354,693 A | 12/1886 | Dick |
| 716,528 A * | 12/1902 | Flowers ................... A43C 1/00 24/713.6 |
| 1,111,437 A | 9/1914 | Butterfield |
| 2,205,356 A | 6/1940 | Rose et al. |
| 2,545,910 A * | 3/1951 | Aprile .................. A43B 19/005 36/15 |
| 2,853,809 A | 9/1958 | Carlo |

(Continued)

FOREIGN PATENT DOCUMENTS

| CN | 101611953 A | 12/2009 |
| CN | 102578760 A | 7/2012 |

(Continued)

OTHER PUBLICATIONS

"Adidas Breaks the Mould With 3D-Printed Performance Footwear," Adidas Group, [Retrieved on Oct. 7, 2015], Retrieved from the Internet: ( http://www.adidas-group.com/en/media/news-archive/press-releases/2015/adi-das-breaks-mould-3d-printed-performance-footwear/ ).

(Continued)

*Primary Examiner* — Ted Kavanaugh

(74) *Attorney, Agent, or Firm* — Sterne, Kessler, Goldstein & Fox P.L.L.C.

(57) ABSTRACT

Articles of footwear comprising modular parts. The modular parts can comprise a first part having a first surface and a second part having a second surface opposing the first surface. A first connector couples the first part to the second part and is integrally formed with the first part. A second connector couples the second part to the first part and is integrally formed with the second part. The first surface and the second surface are mated by the first connector and the second connector.

17 Claims, 10 Drawing Sheets

(56) References Cited

U.S. PATENT DOCUMENTS

| | | | |
|---|---|---|---|
| 3,019,534 A * | 2/1962 | Kauffman | A43B 3/246 D2/977 |
| 3,253,601 A | 5/1966 | Scholl | |
| 3,416,174 A | 12/1968 | Novitske | |
| 3,538,628 A * | 11/1970 | Arthur, Jr. | A43B 3/0078 36/15 |
| 3,793,750 A | 2/1974 | Bowerman | |
| 3,890,725 A * | 6/1975 | Lea | A43B 3/244 36/11.5 |
| 4,012,855 A | 3/1977 | Gardner | |
| 4,271,606 A | 6/1981 | Rudy | |
| 4,297,796 A | 11/1981 | Stirtz et al. | |
| 4,309,831 A | 1/1982 | Pritt | |
| 4,317,294 A * | 3/1982 | Goodyear | A43B 13/36 36/36 B |
| 4,378,643 A | 4/1983 | Johnson | |
| 4,420,894 A * | 12/1983 | Glassman | A43B 13/36 36/12 |
| D272,963 S | 3/1984 | Muller et al. | |
| 4,439,936 A | 4/1984 | Clarke et al. | |
| 4,607,440 A | 8/1986 | Roberts et al. | |
| 4,638,577 A | 1/1987 | Riggs | |
| 4,774,774 A | 10/1988 | Allen, Jr. | |
| 4,887,369 A * | 12/1989 | Bailey | A43B 3/24 36/15 |
| 5,065,531 A * | 11/1991 | Prestridge | A43B 23/0245 36/15 |
| 5,224,279 A | 7/1993 | Agnew | |
| 5,236,637 A | 8/1993 | Hull | |
| 5,337,492 A | 8/1994 | Anderie et al. | |
| 5,367,791 A | 11/1994 | Gross et al. | |
| 5,391,072 A | 2/1995 | Lawton et al. | |
| 5,423,135 A | 6/1995 | Poole et al. | |
| 5,529,473 A | 6/1996 | Lawton et al. | |
| 5,533,280 A * | 7/1996 | Halliday | A43B 3/24 36/15 |
| 5,713,140 A | 2/1998 | Baggenstoss | |
| 5,799,417 A | 9/1998 | Burke et al. | |
| 5,862,614 A | 1/1999 | Koh | |
| 5,930,916 A | 8/1999 | Connor | |
| 5,983,529 A | 11/1999 | Serna | |
| 5,985,383 A | 11/1999 | Allen et al. | |
| 6,014,821 A | 1/2000 | Yaw | |
| 6,021,588 A | 2/2000 | Alviso | |
| 6,076,283 A | 6/2000 | Boie | |
| 6,259,962 B1 | 7/2001 | Gothait | |
| 6,345,454 B1 * | 2/2002 | Cotton | A43B 3/24 36/15 |
| 6,367,172 B2 | 4/2002 | Hernandez | |
| 6,665,958 B2 | 12/2003 | Goodwin | |
| 6,763,611 B1 | 7/2004 | Fusco | |
| 7,383,647 B2 | 6/2008 | Chan et al. | |
| 7,438,846 B2 | 10/2008 | John | |
| 7,676,955 B2 | 3/2010 | Dojan et al. | |
| 7,704,430 B2 | 4/2010 | Johnson et al. | |
| 7,892,474 B2 | 2/2011 | Shkolnik et al. | |
| 8,110,135 B2 | 2/2012 | El-Siblani | |
| 8,191,284 B2 | 6/2012 | Cho | |
| 8,356,426 B1 * | 1/2013 | Daniel | A43B 13/16 36/15 |
| 8,522,454 B2 | 9/2013 | Schindler et al. | |
| 8,739,639 B2 | 6/2014 | Owings et al. | |
| 8,776,396 B2 | 7/2014 | Huynh | |
| 8,914,998 B2 | 12/2014 | Gheorghian et al. | |
| 8,978,272 B2 | 3/2015 | Hurd et al. | |
| 9,205,601 B2 | 12/2015 | DeSimone et al. | |
| 9,211,678 B2 | 12/2015 | DeSimone et al. | |
| 9,216,546 B2 | 12/2015 | DeSimone et al. | |
| 9,320,316 B2 | 4/2016 | Guyan et al. | |
| 9,453,142 B2 | 9/2016 | Rolland et al. | |
| 9,480,298 B2 | 11/2016 | Barnes et al. | |
| 9,486,036 B1 * | 11/2016 | Douglas | A43B 23/0245 |
| D789,060 S | 6/2017 | Guyan et al. | |
| D809,752 S | 2/2018 | Campbell | |
| 9,930,929 B2 | 4/2018 | Cooper et al. | |
| 10,010,133 B2 | 7/2018 | Guyan | |
| 10,010,134 B2 | 7/2018 | Guyan | |
| 10,016,013 B2 | 7/2018 | Kormann et al. | |
| 10,034,516 B2 | 7/2018 | Gheorghian et al. | |
| 10,039,343 B2 | 8/2018 | Guyan | |
| D829,425 S | 10/2018 | Albrecht et al. | |
| D831,315 S | 10/2018 | Mahoney | |
| 10,104,934 B2 | 10/2018 | Guyan | |
| D841,300 S | 2/2019 | Albrecht et al. | |
| D841,301 S | 2/2019 | Albrecht et al. | |
| 10,231,511 B2 | 3/2019 | Guyan et al. | |
| 10,259,171 B2 | 4/2019 | Robeson et al. | |
| D847,481 S | 5/2019 | Albrecht et al. | |
| D857,362 S | 8/2019 | Thompson | |
| D859,801 S | 9/2019 | Jenkins et al. | |
| D862,051 S | 10/2019 | Goussev et al. | |
| D862,866 S | 10/2019 | Albrecht et al. | |
| 10,426,226 B2 | 10/2019 | Guyan et al. | |
| 10,434,706 B2 | 10/2019 | Robeson et al. | |
| D873,546 S | 1/2020 | Henrichot | |
| D876,056 S | 2/2020 | Henrichot | |
| D878,016 S | 3/2020 | Henrichot | |
| D879,428 S | 3/2020 | Braun et al. | |
| D879,434 S | 3/2020 | Fick et al. | |
| 10,575,588 B2 | 3/2020 | Perrault et al. | |
| D880,120 S | 4/2020 | Fick et al. | |
| D880,122 S | 4/2020 | Fick et al. | |
| D880,131 S | 4/2020 | Fick et al. | |
| D882,227 S | 4/2020 | Braun et al. | |
| 10,639,861 B2 | 5/2020 | Minh et al. | |
| D890,485 S | 7/2020 | Perrault et al. | |
| D907,904 S | 1/2021 | Perrault et al. | |
| 11,039,664 B2 * | 6/2021 | Huneau | A43B 23/26 |
| 2002/0029496 A1 * | 3/2002 | Morle | A43B 5/18 36/99 |
| 2002/0078598 A1 | 6/2002 | Bell | |
| 2004/0087230 A1 | 5/2004 | Wildeman | |
| 2006/0201028 A1 | 9/2006 | Chan et al. | |
| 2006/0254087 A1 | 11/2006 | Fechter | |
| 2007/0011914 A1 | 1/2007 | Keen et al. | |
| 2007/0043582 A1 | 2/2007 | Peveto et al. | |
| 2008/0289218 A1 | 11/2008 | Nakano | |
| 2009/0013556 A1 | 1/2009 | Nishiwaki et al. | |
| 2009/0100713 A1 | 4/2009 | Adami et al. | |
| 2009/0126225 A1 | 5/2009 | Jarvis | |
| 2009/0139112 A1 | 6/2009 | Garneau | |
| 2009/0183392 A1 | 7/2009 | Shane | |
| 2009/0211114 A1 | 8/2009 | Ivester et al. | |
| 2009/0293309 A1 | 12/2009 | Keating et al. | |
| 2010/0122471 A1 | 5/2010 | Edington et al. | |
| 2010/0170106 A1 | 7/2010 | Brewer et al. | |
| 2010/0199520 A1 | 8/2010 | Dua et al. | |
| 2010/0251565 A1 | 10/2010 | Litchfield et al. | |
| 2010/0281714 A1 | 11/2010 | Carboy et al. | |
| 2011/0099855 A1 | 5/2011 | Cho | |
| 2012/0117825 A9 | 5/2012 | Jarvis | |
| 2012/0167416 A1 | 7/2012 | Christensen et al. | |
| 2012/0178259 A1 | 7/2012 | Miyazaki et al. | |
| 2012/0180335 A1 | 7/2012 | Mahoney | |
| 2012/0186107 A1 | 7/2012 | Crary et al. | |
| 2013/0118036 A1 | 5/2013 | Gibson | |
| 2013/0145653 A1 | 6/2013 | Bradford | |
| 2013/0171019 A1 | 7/2013 | Gessler et al. | |
| 2013/0292862 A1 | 11/2013 | Joyce | |
| 2013/0295212 A1 | 11/2013 | Chen et al. | |
| 2014/0020191 A1 | 1/2014 | Jones et al. | |
| 2014/0026773 A1 | 1/2014 | Miller | |
| 2014/0029030 A1 | 1/2014 | Miller | |
| 2014/0109441 A1 | 4/2014 | McDowell et al. | |
| 2014/0150297 A1 | 6/2014 | Holmes et al. | |
| 2014/0182170 A1 | 7/2014 | Wawrousek et al. | |
| 2014/0223783 A1 | 8/2014 | Wardlaw et al. | |
| 2014/0226773 A1 | 8/2014 | Toth et al. | |
| 2014/0259779 A1 | 9/2014 | Hashish et al. | |
| 2014/0259787 A1 | 9/2014 | Guyan et al. | |
| 2014/0259788 A1 | 9/2014 | Dojan et al. | |
| 2014/0259789 A1 | 9/2014 | Dojan et al. | |
| 2014/0299009 A1 | 10/2014 | Miller et al. | |

(56) References Cited

U.S. PATENT DOCUMENTS

| | | | |
|---|---|---|---|
| 2014/0300675 A1 | 10/2014 | Miller et al. | |
| 2014/0300676 A1 | 10/2014 | Miller et al. | |
| 2014/0310991 A1 | 10/2014 | Greene et al. | |
| 2015/0000161 A1 | 1/2015 | Peyton et al. | |
| 2015/0020414 A1* | 1/2015 | Mulholland | A43B 1/0081 36/100 |
| 2015/0033577 A1 | 2/2015 | Dahl et al. | |
| 2015/0033579 A1 | 2/2015 | Barnes et al. | |
| 2015/0033581 A1 | 2/2015 | Barnes et al. | |
| 2015/0089841 A1 | 4/2015 | Smaldone et al. | |
| 2015/0128448 A1 | 5/2015 | Lockyer | |
| 2015/0181976 A1 | 7/2015 | Cooper et al. | |
| 2015/0223560 A1 | 8/2015 | Wawrousek et al. | |
| 2015/0245686 A1 | 9/2015 | Cross | |
| 2015/0331402 A1 | 11/2015 | Lin et al. | |
| 2015/0351493 A1 | 12/2015 | Ashcroft et al. | |
| 2015/0360419 A1 | 12/2015 | Willis et al. | |
| 2016/0051009 A1 | 2/2016 | Kormann et al. | |
| 2016/0122493 A1 | 5/2016 | Farris et al. | |
| 2016/0137839 A1 | 5/2016 | Rolland et al. | |
| 2016/0160077 A1 | 6/2016 | Rolland et al. | |
| 2016/0180440 A1 | 6/2016 | Dibenedetto et al. | |
| 2016/0288376 A1 | 10/2016 | Sun et al. | |
| 2016/0295971 A1 | 10/2016 | Arnese et al. | |
| 2016/0324260 A1 | 11/2016 | Guyan | |
| 2016/0324261 A1 | 11/2016 | Guyan | |
| 2016/0360828 A1 | 12/2016 | Guyan | |
| 2016/0374428 A1 | 12/2016 | Kormann et al. | |
| 2017/0127758 A1* | 5/2017 | Cooper | A43B 7/1405 |
| 2017/0129167 A1 | 5/2017 | Castanon | |
| 2017/0129169 A1 | 5/2017 | Batchelder et al. | |
| 2017/0150778 A1 | 6/2017 | Youngs et al. | |
| 2017/0231316 A1* | 8/2017 | Sethi | A43B 13/36 36/97 |
| 2017/0251760 A1 | 9/2017 | Waatti | |
| 2018/0014606 A1 | 1/2018 | Mokos | |
| 2018/0070736 A1 | 3/2018 | Achten et al. | |
| 2018/0103719 A1 | 4/2018 | Chen | |
| 2018/0126630 A1 | 5/2018 | Panzer et al. | |
| 2018/0243976 A1 | 8/2018 | Feller | |
| 2018/0271211 A1 | 9/2018 | Perrault et al. | |
| 2018/0271213 A1 | 9/2018 | Perrault et al. | |
| 2018/0290374 A1 | 10/2018 | Willis et al. | |
| 2018/0368518 A1 | 12/2018 | Re et al. | |
| 2019/0069632 A1 | 3/2019 | Meschter | |
| 2019/0098960 A1 | 4/2019 | Weisskopf et al. | |
| 2019/0160733 A1 | 5/2019 | Mirkin et al. | |
| 2019/0223543 A1 | 7/2019 | Tamm et al. | |
| 2019/0223551 A1 | 7/2019 | Hoffer et al. | |
| 2019/0261735 A1* | 8/2019 | Wawrousek | A43D 1/02 |
| 2019/0269200 A1 | 9/2019 | Tseng | |
| 2019/0289960 A1 | 9/2019 | Loveder | |
| 2020/0093221 A1 | 3/2020 | Caldwell et al. | |
| 2020/0156308 A1 | 5/2020 | Ramos et al. | |
| 2020/0329815 A1 | 10/2020 | Schmid | |
| 2021/0195989 A1 | 7/2021 | Iwasa et al. | |
| 2021/0195995 A1 | 7/2021 | Sakamoto et al. | |
| 2022/0110406 A1 | 4/2022 | Salari-Sharif et al. | |
| 2022/0110407 A1 | 4/2022 | Hettinga et al. | |
| 2022/0110408 A1 | 4/2022 | Coonrod et al. | |
| 2023/0292877 A1 | 9/2023 | Galasso et al. | |
| 2024/0032649 A1 | 2/2024 | Corcoran-Tadd et al. | |

FOREIGN PATENT DOCUMENTS

| | | |
|---|---|---|
| CN | 203378623 U | 1/2014 |
| CN | 209391169 U | 9/2019 |
| CN | 209403686 U | 9/2019 |
| CN | 110859355 A | 3/2020 |
| EP | 0526892 A2 | 2/1993 |
| EP | 2564719 A1 | 3/2013 |
| EP | 2424398 B1 | 12/2015 |
| EP | 3013171 A1 | 5/2016 |
| EP | 3165109 A1 | 5/2017 |
| EP | 2564714 B1 | 7/2018 |
| EP | 3939462 A2 | 1/2022 |
| ES | 2442448 A1 | 2/2014 |
| ES | 2578730 A1 | 7/2016 |
| JP | 3192899 B2 | 7/2001 |
| JP | 2002238609 A | 8/2002 |
| JP | 2011251190 A | 12/2011 |
| JP | 2014151201 A | 8/2014 |
| JP | 3192899 U | 9/2014 |
| WO | WO-2010126708 A2 | 11/2010 |
| WO | WO-2014008331 A2 | 1/2014 |
| WO | WO-2014009587 A1 | 1/2014 |
| WO | WO-2014015037 A2 | 1/2014 |
| WO | WO-2014100462 A1 | 6/2014 |
| WO | WO-2015164234 A1 | 10/2015 |
| WO | WO-2015169941 A1 | 11/2015 |
| WO | WO-2015169942 A1 | 11/2015 |
| WO | WO-2016066750 A1 | 5/2016 |
| WO | WO-2017210298 A1 | 12/2017 |
| WO | WO-2021169804 A1 | 9/2021 |
| WO | WO-2023007175 A1 | 2/2023 |

OTHER PUBLICATIONS

Green, D., Adidas is finally bringing 3D-printed shoes into the mainstream, Business Insider.com, Dennis Green, Retrieved from the Internet: (URL:https://www.businessinsider.com/adidas-releases-futurecraft-4d-shoe-2017-4/commerce-on-business-insider), (Year: 2017).

Januszeiwicz, R., et al., "Layerless Fabrication With Continuous Liquid Interface Production," Proceedings of the National Academy of Sciences of the United States of America 113(42):11703-11708, National Academy of Sciences, United States (Oct. 2016).

Nikolic, I., Reebok Flexagon Training Shoes, Behance.net, Ilija Nikolic, Retrieved from the Internet (URL: https://www.behance.net/gallery/68953047/REEBOK-FLEXAGON-Training-Shoes?t-racking_source=curated_galleries_list) 2018, 10 pages.

Panetta., et al., "Elastic Textures for Additive Fabrication," ACM Transactions on Graphics 34(4), Article No. 135 (Aug. 2015).

Pearson, D., Adidas is giving Olympic athletes its first-ever 3D-printed shoes,Highsnobiety.com, Retrieved from the Internet: (URL:https://www.highsnobiety.com/2016/08/11/adidas-3d-printed-shoes-olympics/), (Year: 2016).

Reebok Flexagon, Retrieved from the Internet (URL: https://www.reebok.com/us/reebok-flexagon/CN2583.html), 2018.

Richard, B., Here's what 3D printed Future Craft adidas Yeezy boosts would look like Yeezys geared up for the future Retrieved from the Internet: (URL:https://solecollector.com/news/2015/11/adidas-yeezy-futurecraft-3d-print), (Year: 2015).

Tumbleston, J.R., et al., "Continuous Liquid Interface Production of 3d Objects," Science 347(6228):1349-1352, American Association for the Advancement of Science, United States (Mar. 2015).

Worman, C., Top Tennis Shoes Featuring a 6-Month Outsole Warranty, Retrieved from the Internet (URL: https://blogs.tennisexpress.com/blogs/top-tennis-shoes-featuring- -a-6-month-outsole-warranty/), (Year: 2018), 11 pages.

* cited by examiner

MODULAR FOOTWEAR AND METHODS OF MAKING THE SAME

FIELD

The present disclosure relates to articles of footwear. More particularly, described embodiments relate to footwear comprising modular parts.

BACKGROUND

Traditional shoe manufacturing processes have typically relied on standardized sizes and designs, which, while efficient for mass production, often fail to meet the specific needs of individual consumers. This standardization results in a portion of the population experiencing issues such as poor fit, discomfort, and inadequate support.

Attempts have been made to address the issue of poor fit and comfort in footwear. These include the development of insoles and inserts designed to provide better arch support and cushioning, as well as adjustable shoe designs that aim to accommodate a range of foot shapes and sizes. However, these solutions can fall short of providing a comprehensive and truly personalized fit.

In addition to fit and comfort, the appearance of footwear has become increasingly important to consumers, particularly as fashion trends continue to evolve rapidly. Consumers are seeking more ways to express their personal style through customized designs, colors, and patterns in their footwear. Traditional mass-produced shoes often do not meet the unique aesthetic preferences of individual users, leading to a growing demand for customizable options that cater to personal fashion tastes.

Given the limitations of standard footwear and the increasing demand for products that cater to individual needs, a clear need exists for the development of more personalized footwear solutions.

BRIEF SUMMARY

Embodiments according to the present disclosure are directed to articles of footwear comprising modular parts that can be assembled to form all or a portion of an article of footwear. Some or all of these parts can comprise integrally formed connectors that couple a first part to a second part. The modular parts can be assembled to form various portions of the article of footwear.

A first embodiment (I) of the present disclosure is directed to an article of footwear, comprising: a first part having a first surface; a second part having a second surface opposing the first surface; a first connector that couples the first part to the second part, the first connector being integrally formed with the first part; and a second connector that couples the second part to the first part, the second connector being integrally formed with the second part; wherein the first surface and the second surface are mated by the first connector and the second connector.

A second embodiment (II) of the present disclosure is directed to the article of footwear of the first embodiment (I) wherein the first connector extends from the first surface and the second connector is recessed from the second surface, and the first connector engages the second connector to mate the first surface and the second surface.

A third embodiment (III) of the present disclosure is directed to the article of footwear of the second embodiment (II), wherein the first connector comprises a tab extending from the first surface and the second connector comprises a slot, and the tab engages with the slot to mate the first surface and the second surface.

A fourth embodiment (IV) of the present disclosure is directed to the article of footwear of any one of the previous embodiments, wherein the first part comprises one of a footwear upper portion or a midsole portion, and the second part comprises the other of the footwear upper portion or the midsole portion.

A fifth embodiment (V) of the present disclosure is directed to the article of footwear of any one of the previous embodiments, wherein the first part comprises one of a footwear upper portion or a tongue portion, and the second part comprises the other of the upper portion or the tongue portion.

A sixth embodiment (VI) of the present disclosure is directed to the article of footwear of the fifth embodiment (V), wherein the tongue portion defines a first plurality of openings and the upper portion defines a second plurality of openings, and wherein a shoelace extends through the first plurality of openings and the second plurality of openings to couple the tongue portion to the upper portion.

A seventh embodiment (VII) of the present disclosure is directed to the article of footwear of any one of the previous embodiments, wherein the first part comprises one of a footwear upper portion or an insert, and the second part comprises the other of the upper portion or the insert.

An eighth embodiment (VIII) of the present disclosure is directed to the article of footwear of the seventh embodiment (VII), wherein at least part of the textile portion is located between the upper portion and the insert.

A ninth embodiment (IX) of the present disclosure is directed to the article of footwear of the eighth embodiment (VIII), wherein the textile portion comprises a loop extending through the upper portion, the loop configured to receive a shoelace.

A tenth embodiment (X) of the present disclosure is directed to the article of footwear of either one of the eighth embodiment (VIII) or the ninth embodiment (IX), wherein the textile portion comprises an opening that receives the first connector or the second connector to secure the textile portion between the upper portion and the insert.

An eleventh embodiment (XI) of the present disclosure is directed to the article of footwear of any one of the previous embodiments, wherein at least one of the first part or the second part is formed by an additive manufacturing process and comprises a three-dimensional mesh comprising a plurality of unit cells, each unit cell comprising a plurality of unit cell struts defining a three-dimensional structure and a plurality of nodes at which one or more unit cell struts are connected.

A twelfth embodiment (XII) of the present disclosure is directed to the article of footwear of any one of the previous embodiments, wherein at least one of the first part or the second part is a single piece.

A thirteenth embodiment (XIII) of the present disclosure is directed to the article of footwear of any one of the previous embodiments, further comprising a support member located between the first part and the second part, the support member coupled to the first part and the second part.

A fourteenth embodiment (XIV) of the present disclosure is directed to the article of footwear of the thirteenth embodiment (XIII), wherein the support member defines an aperture that receives at least one of the first connector or the second connector.

A fifteenth embodiment (XV) of the present disclosure is directed to the article of footwear of either one of the thirteenth embodiment (XIII) or the fourteenth embodiment (XIV), wherein the support member comprises a third connector integrally formed with the support member, the third connector coupling the support member to at least one of the first part or the second part.

A sixteenth embodiment (XVI) of the present disclosure is directed to the article of footwear of any one of the previous embodiments, wherein engagement between the first connector and the second connector creates an interlocking fit at a joint between the first part and the second part, and wherein the joint between the first part and the second part comprises a cured resin.

A seventeenth embodiment (XVII) of the present disclosure is directed to the article of footwear of the sixteenth embodiment (XVI), wherein the cured resin comprises a first material, and at least one of the first part or the second part is formed from the first material.

An eighteenth embodiment (XVIII) of the present disclosure is directed to the article of footwear of any one of the previous embodiments, wherein the second part comprises a third surface opposing the second surface, the article of footwear further comprising: a third part comprising a fourth surface opposing the third surface; a third connector that couples the third part to the second part, the third connector being integrally formed with the third part; a fourth connector that couples the fourth part to the third part, the fourth connector being integrally formed with the fourth part wherein the third surface and the fourth surface are mated by the third connector and the fourth connector.

A nineteenth embodiment (XIX) of the present disclosure is directed to the article of footwear of the eighteenth embodiment (XVIII), wherein the second part is a midsole portion and the third part is an outsole portion.

A twentieth embodiment (XX) of the present disclosure is directed to the article of footwear of any one of the first embodiment (I) through the sixth embodiment (VI) or any one of the eleventh embodiment (XI) through the nineteenth embodiment (XIX), wherein the first part comprises a first midsole portion and the second part comprises a second midsole portion received within a cavity formed in the first midsole portion.

A twenty-first embodiment (XXI) of the present disclosure is directed to the article of footwear of any one of the first embodiment (I) through the sixth embodiment (VI) or any one of the eleventh embodiment (XI) through the nineteenth embodiment (XIX), wherein the first part comprises a midsole portion and the second part comprises a shell for receiving a portion of an upper for the article of footwear.

A twenty-second embodiment (XXII) of the present disclosure is directed to the article of footwear of any one of the first embodiment (I) through the sixth embodiment (VI) or any one of the eleventh embodiment (XI) through the nineteenth embodiment (XIX), wherein the first part comprises a midsole portion and the second part comprises a strap, a lace support, a cage, a flange, a heel counter, or a sleeve extending from the midsole portion.

A twenty-third embodiment (XXIII) of the present disclosure is directed to a method of making an article of footwear, comprising: assembling a first part to a second part such that a first surface of the first part opposes a second surface of the second part, the first part comprising a first connector integrally formed with the first part, the second part comprising a second connector integrally formed with the second part, wherein assembling the first part to the second part causes the first connector to engage the second connector to mate the first surface and the second surface.

A twenty-fourth embodiment (XXIV) of the present disclosure is directed to the method of making an article of footwear of the twenty-third embodiment (XXIII), further comprising expanding one of the first part or the second part to secure the first part to the second part.

A twenty-fifth embodiment (XXV) of the present disclosure is directed to the method of making an article of footwear of the twenty-fourth embodiment (XXIV), wherein expanding one of the first part or the second part comprises heating the first part and the second part.

A twenty-sixth embodiment (XXVI) of the present disclosure is directed to the method of making an article of footwear of any one of the twenty-third embodiment (XXIII) through the twenty-fifth embodiment (XXV), further comprising: forming the first part from a first material with an additive manufacturing process; and forming the second part from a second material with the additive manufacturing process.

A twenty-seventh embodiment (XXVII) of the present disclosure is directed to the method of making an article of footwear of the twenty-sixth embodiment (XVI), wherein the first material and the second material are the same material.

A twenty-eighth embodiment (XXVIII) of the present disclosure is directed to the method of making an article of footwear of either one of the twenty-sixth embodiment (XXVI) or the twenty-seventh embodiment (XXVII), further comprising: disposing a curable resin between the first part and the second part when the first part and the second part are in a green state; at least partially curing the curable resin; and heating the first part, the second part, and the at least partially cured resin to secure the first part to the second part.

A twenty-ninth embodiment (XXIX) of the present disclosure is directed to the method of making an article of footwear of the twenty-eighth embodiment (XVIII), wherein the curable resin comprises a first material and at least one of the first part or the second part is formed from the first material.

A thirtieth embodiment (XXX) of the present disclosure is directed to the method of making an article of footwear of any one of the twenty-sixth embodiment (XXVI) through the twenty-ninth embodiment (XXIX), wherein the first part and the second part are formed at the same time and are connected by one or more supports formed by the additive manufacturing process, and wherein the one or more supports is removed before assembling the first part to the second part.

A thirty-first embodiment (XXXI) of the present disclosure is directed to the method of making an article of footwear of any one of the twenty-sixth embodiment (XXVI) through the thirtieth embodiment (XXX), wherein the first part and the second part are formed separately at the same time.

A thirty-second embodiment (XXXII) of the present disclosure is directed to the method of making an article of footwear of any one of the twenty-sixth embodiment (XXVI) through the thirty-first embodiment (XXXI), further comprising: forming a third part with the additive manufacturing process, wherein the third part is formed coupled to one of the first part or the second part by one or more supports; decoupling the third part from the one of the first part or the second part by removing the one or more supports; and assembling the third part to the first part or the second part.

A thirty-third embodiment (XXXIII) of the present disclosure is directed to the method of making an article of footwear of any one of the twenty-third embodiment (XXIII)

through the thirty-second embodiment (XXXII), further comprising: inserting a support member into a recess defined by the first part in a green state; and expanding the first part around the support member, wherein the support member constrains expansion of the first part to impart a shape to the first part.

A thirty-fourth embodiment (XXXIV) of the present disclosure is directed to the method of making an article of footwear of the thirty-third embodiment (XXXIII), wherein expanding the first part comprises heating the first part.

A thirty-fifth embodiment (XXXV) of the present disclosure is directed the method of making an article of footwear of either one of the thirty-third embodiment (XXXIII) or the thirty-fourth embodiment (XXXIV), wherein the support member comprises an extension located at an end of the support member, the extension configured to constrain the expansion of the first part.

A thirty-sixth embodiment (XXXVI) of the present disclosure is directed to the method of making an article of footwear of any one of the twenty-third embodiment (XXIII) through the thirty-fifth embodiment (XXXV), further comprising: inserting a curved support member into a recess defined by the first part in a green state to impart a curved shape to the first part; and heating the curved support member and the first part to cure the first part in the curved shape.

A thirty-seventh embodiment (XXXVII) of the present disclosure is directed to an article of footwear, comprising: an additively manufactured footwear part comprising an upper portion for the article of footwear, a sole portion for the article of footwear, or both; and a textile portion connected to the additively manufactured footwear part by lacing.

A thirty-eighth embodiment (XXXVIII) of the present disclosure is directed to the article of footwear of the thirty-seventh embodiment (XXXVII), wherein the additively manufactured footwear part comprises the upper portion and the lacing extends through a plurality of openings formed in in the additively manufactured footwear part.

A thirty-ninth embodiment (XXXIX) of the present disclosure is directed to the article of footwear of the thirty-seventh embodiment (XXXVII), wherein the additively manufactured footwear part comprises the upper portion, wherein textile portion comprises a plurality of loops each extending through a respective opening formed in the upper portion, and wherein the lacing extends through the loops.

A fortieth embodiment (XL) of the present disclosure is directed to the article of footwear the thirty-seventh embodiment (XXXVII), wherein the additively manufactured footwear part comprises a three-dimensional mesh comprising a plurality of interconnected unit cells, each interconnected unit cell comprising a plurality of unit cell struts defining a three-dimensional structure and a plurality of nodes at which one or more unit cell struts are connected, and wherein the lacing extends through a plurality of openings in the additively manufactured footwear that are defined by unit cells of the three-dimensional mesh.

A forty-first embodiment (XLI) of the present disclosure is directed to the article of footwear of the fortieth embodiment (XL), wherein the additively manufactured footwear part comprises the sole portion.

BRIEF DESCRIPTION OF THE DRAWINGS/FIGURES

DETAILED DESCRIPTION

Figure 1:
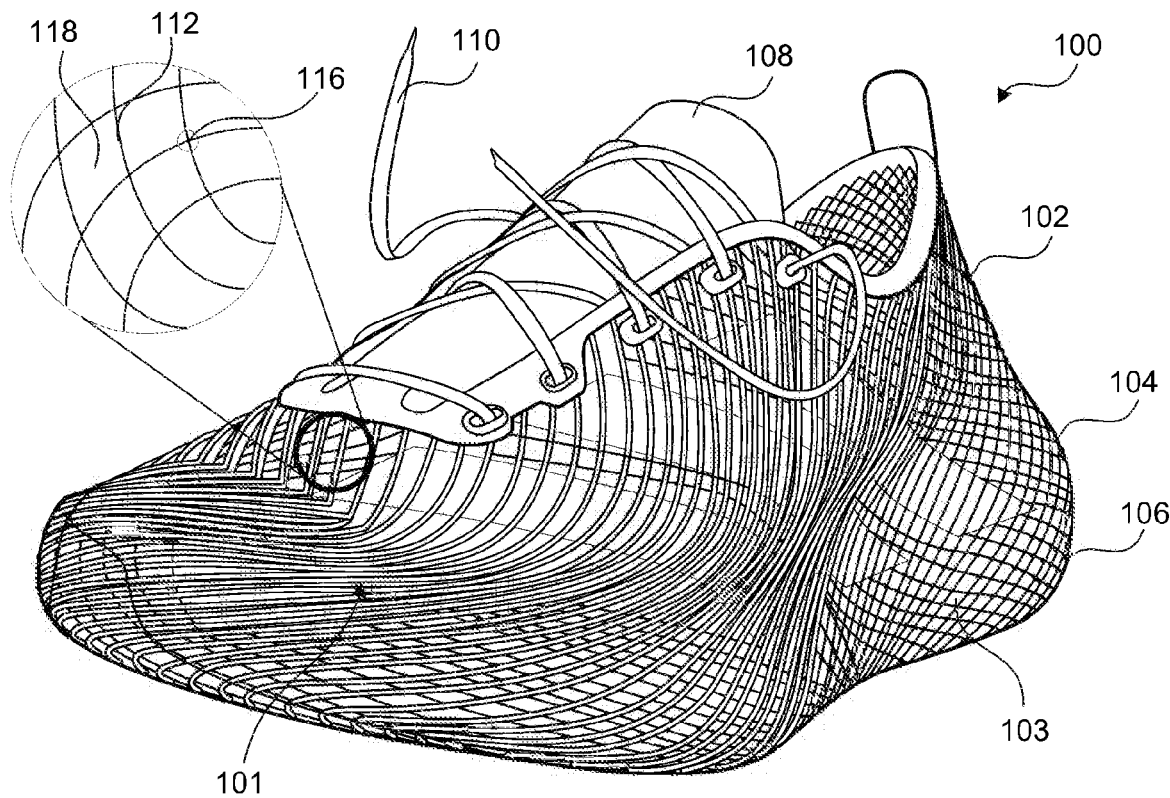
FIG. 1 shows an article of footwear according to some embodiments.

The indefinite articles "a," "an," and "the" include plural referents unless clearly contradicted or the context clearly dictates otherwise.

As used herein, unless specified otherwise, references to "first," "second," "third," "fourth," etc. are not intended to denote order, or that an earlier-numbered feature is required for a later-numbered feature. Also, unless specified otherwise, the use of "first," "second," "third," "fourth," etc. does not necessarily mean that the "first," "second," "third," "fourth," etc. features have different properties or values.

The term "comprising" is an open-ended transitional phrase. A list of elements following the transitional phrase "comprising" is a non-exclusive list, such that elements in addition to those specifically recited in the list can also be present. The phrase "consisting essentially of" limits the composition of a component to the specified materials and those that do not materially affect the basic and novel characteristic(s) of the component. The phrase "consisting of" limits the composition of a component to the specified materials and excludes any material not specified.

Where a range of numerical values comprising upper and lower values is recited herein, unless otherwise stated in specific circumstances, the range is intended to include the endpoints thereof, and all integers and fractions within the range. It is not intended that the disclosure or claims be limited to the specific values recited when defining a range. Further, when an amount, concentration, or other value or parameter is given as a range, one or more ranges, or as list of upper values and lower values, this is to be understood as specifically disclosing all ranges formed from any pair of any upper range limit or value and any lower range limit or value, regardless of whether such pairs are separately disclosed.

Mass produced footwear is typically manufactured using standardized sizes and designs to increase production efficiency. Customers looking for non-standard sizes and/or more control over the design of their footwear can pay much more than the cost of comparable standard footwear.

Footwear according to embodiments of the present application can provide the wearer with an economically feasible ability to have a customized fit and/or appearance of footwear based on the preferences of the wearer. In some embodiments, various portions of footwear as described herein can be additively manufactured to produce customized footwear desired by a wearer. For example, portions of a shoe such as an upper portion, a midsole portion, and/or a tongue portion can be additively manufactured and then assembled to create a customized shoe. Thus, a wearer can choose various shapes, sizes, and colors of the different portions based on a size and shape of the wearer's foot and the color and style of the shoe the wearer wants, thereby creating a unique, personalized shoe.

Articles of footwear with multiple design features can also increase manufacturing time and complexity. This disclosure seeks to address this issue by providing articles of footwear comprising one or more modular parts integrally formed with connectors configured to join separate parts. The modular parts can be assembled to form a completed article of footwear, or portion thereof.

Embodiments described herein can comprise one or more modular parts formed as separate integral pieces in a first position and/or shape and assembled into a second position and/or shape to create a desired footwear structures. In some embodiments, the one or more parts can be formed in a first position with at least one planar surface and assembled with a planar surface of another part to create a non-planar footwear configuration. By enabling parts to be formed with a planar surfaces that can be assembled to create different shapes, embodiments described herein facilitate the manufacturing of footwear, or footwear components, with a variety of manufacturing techniques, including additive manufacturing techniques, which often build parts on a flat surface.

The one or more modular assembled together can be connected to each other at one or more connection points. In some embodiments, the one or more components can be formed with integral corresponding connectors configured to couple with each other at a connection point. In some embodiments, the integrally formed connectors can mate corresponding surfaces of two or more of the modular parts. In some embodiments, the integrally formed connectors can connect one or more modular parts, a separate footwear component, or both at a connection point. In some embodiments, the one or more connection points can comprise a separate element configured to connect one or more modular parts, a separate footwear component, or both. Exemplary separate elements comprise, but are not limited to, stitching, lacing, an adhesive, or a mechanical connector such as a threaded connector, a luer-lock connector, or a snap fit connector.

Embodiments described herein can also leverage the modularity of the parts to integrate other footwear components not formed together with the one or more components. For example, in some embodiments, the modularity of two or more parts can be used to integrate a textile component. As another example, the modularity of two or more parts can be used to integrate a separate additively manufactured component. In some embodiments, the component (for example, textile component) can be sandwiched between two modular parts to attach the component to an article of footwear. In such embodiments, two or more parts can be connected to the component (for example, textile component) at one or more connection points. Integrating components such a textile components with modular parts as described here can provide a high strength connection between the component and an article of footwear.

FIG. 1 shows an article of footwear 100 according to some embodiments. The article of footwear 100 can be any type of footwear a wearer can secure to a foot to protect and cushion the foot. Though shown in FIG. 1 as a shoe, the article of footwear 100 can also be a sandal, a boot, a sport-specific shoe (for example, baseball cleats, soccer cleats, golf shoes, etc.), or any other type of footwear.

The article of footwear 100 comprises an upper portion 102. The upper portion 102 can cover at least a portion of a top of a foot of the wearer. Article of footwear 100 also comprises a sole portion 103. Upper portion 102 is connected to sole portion 103 and is generally formed to receive the foot of a user through an opening. In some embodiments, sole portion 103 and upper portion 102 can be formed as two separate elements that are joined together. In some embodiments, sole portion 103 and upper portion 102 can be integrally formed as a single piece. Sole portion 103 can define all or a portion of the sole of article of footwear 100 and upper portion 102 can define all or a portion of the upper of article of footwear 100.

In some embodiments, upper portion 102 can comprise two or more modular portions as described herein. For example, in some embodiments upper portion 102 can comprise two or more of a modular portion defining a strap, a modular portion defining a lace support, a modular portion defining a cage (for example, a midfoot cage or a toe cage), a modular portion defining a flange, a modular portion defining a heel counter, and a modular portion defining a sleeve on article of footwear 100. In some embodiments, modular portions of upper portion 102 can extend from midsole portion 104 of footwear 100.

In some embodiments, sole portion 103 can comprise a midsole portion 104. In some embodiments, sole portion 103 can comprise an outsole portion 106. In some embodiments, sole portion 103 can comprise midsole portion 104 and outsole portion 106. The outsole portion 106 can contact a ground surface on which the wearer is walking, running, etc. The midsole portion 104 can be located between the upper portion 102 and the outsole portion 106, and can provide cushioning between the foot of the wearer and the ground.

Figure 7A:
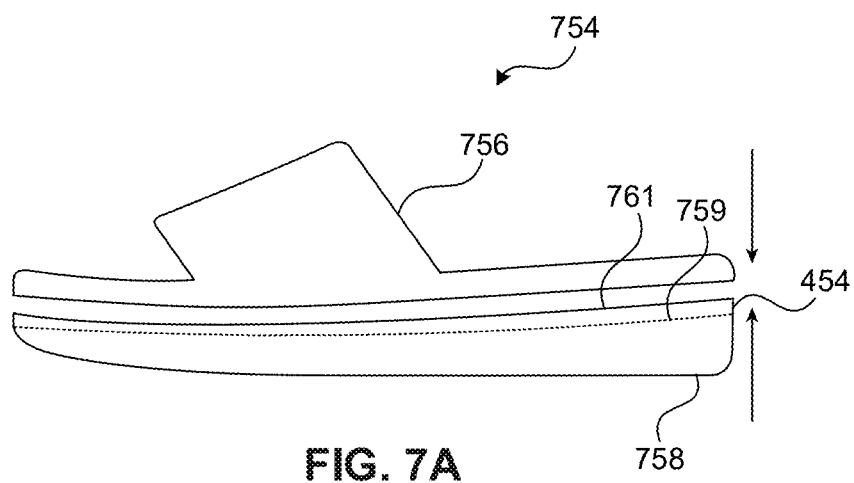
FIGS. 7A-7C show articles of footwear according to some embodiments.
Figure 7B:
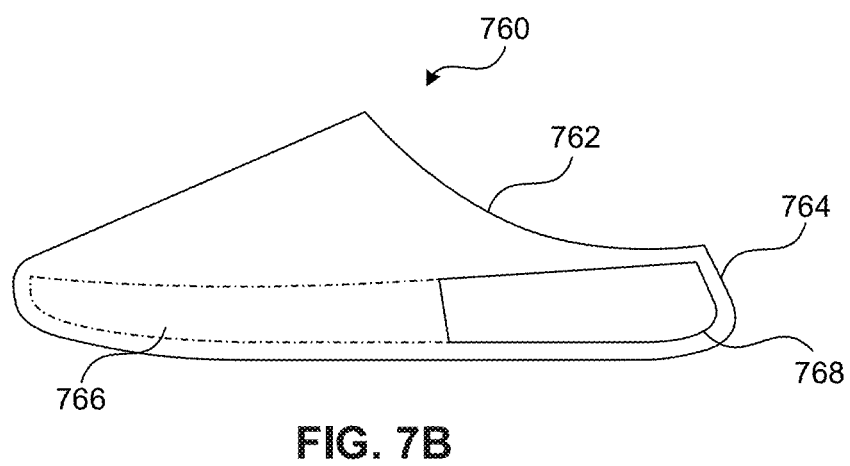

In some embodiments, sole portion 103 can comprise a modular midsole portion as described as herein with reference to FIG. 7B. In such embodiments, sole portion 103 can comprise one or more cavities 766 formed in the sole portion 103 sized to receive one or more partial midsole portions 768. For example, the cavity 766 can comprise an upper facing opening into which one or more partial midsole portions 768 is inserted. As another example, the cavity 766 can comprise a ground facing opening into which one or more partial midsole portions 768 is inserted. In embodiments comprising one or more cavities 766 comprising a ground facing opening, outsole portion 106 can fully or partially cover the ground facing opening of each cavity 766 on footwear 100. In some embodiments, sole portion 103 can comprise one or more cavities 766 with an upper facing opening and one or more cavities with a ground facing opening. In some embodiments, the one or more cavities 766 can comprise a lateral facing opening and/or a medial facing opening into which one or more partial midsole portions 768 is inserted.

In some embodiments, the article of footwear 100 can comprise a tongue portion 108. The tongue portion 108 can be coupled to the upper portion 102 and can move relative to the upper portion 102 to allow the wearer to insert their foot into and remove the foot from the article of footwear 100. In some embodiments, the article of footwear 100 can comprise a shoelace 110. In some embodiments, the shoelace 110 can extend through one or more apertures in the upper portion 102. In some embodiments, tongue portion 108 can comprise a textile portion coupled to an article of footwear between two modular portions as described herein in FIG. 11.

Exemplary materials for the upper portion 102, the sole portion 103, the tongue portion 108, and any other component of the article of footwear 100 include, but are not limited to, a foam, a rubber, ethyl vinyl acetate (EVA), a thermoplastic elastomer, a polyurethane, a thermoplastic polyurethane (TPU), an elastomeric polyurethane, an expanded thermoplastic polyurethane (eTPU), an expanded elastomeric polyurethane, a polyether block amide (PEBA), an expanded polyether block amide (ePEBA), a thermoplastic rubber (TPR), and a polyolefin, for example polyethylene (PE), polystyrene (PS), or polypropylene (PP), polyamides (nylon), or a combination of any of these materials, or a foam comprising one or more of these materials. Additional materials for use in forming the upper portion 102, the sole portion 103, the tongue portion 108, or any other portion of the article of footwear 100 include carbon and carbon allotropes, such as graphene, carbon nanotubes, and carbon fibers, fiber reinforced polymers, biological materials such as Mycelium, and metals, such as aluminum, steel, or titanium, among others and combinations thereof.

In some embodiments, any component or portion of footwear described herein (for example, the upper portion 102, the midsole portion 104, the outsole portion 106, the tongue portion 108, etc.) can be formed as a single, integral part. Examples of manufacturing techniques that can be used to form components in the form of a single, integral part comprise molding, casting, and additive manufacturing (three-dimensional (3-D) printing). Accordingly, any component or portion of footwear described herein can be an integrally formed footwear part that connects to one or more other integrally formed footwear parts as described herein.

Exemplary additive manufacturing techniques include for example, selective laser sintering, selective laser melting, selective heat sintering, stereo lithography, fused deposition modeling, or 3-D printing in general. Various additive manufacturing techniques related to articles of footwear are described for example in US 2009/0126225, WO 2010/126708, US 2014/0300676, US 2014/0300675, US 2014/0299009, US 2014/0026773, US 2014/0029030, WO 2014/008331, WO 2014/015037, US 2014/0020191, EP 2564719, EP 2424398, and US 2012/0117825. In some embodiments, the additive manufacturing process can include a continuous liquid interface production process. For example, the additive manufacturing process can include a continuous liquid interface production process as described in U.S. Pat. No. 9,453,142, issued on Sep. 27, 2016, which is hereby incorporated in its entirety by reference thereto.

In some embodiments, 3-D printing an article of footwear, or component thereof, can comprise 3-D printing the article or component in an intermediate green state, shaping and/or assembling the article or component in the green state, and curing the green state in its final shape. In some embodiments, 3-D printing an article of footwear, or component thereof, can comprise 3-D printing the article or component in an intermediate green state, expanding and/or assembling the intermediate green state, and curing the green state in its final shape. In some embodiments, 3-D printing an article of footwear, or component thereof, can comprise 3-D printing the article or component in an intermediate green state, expanding and/or assembling the intermediate green state, shaping the article or component in the green state, and curing the green state in its final shape.

In some embodiments, 3-D printing an article of footwear, or component thereof, can comprise 3-D printing multiple components in an intermediate green state, shaping and/or assembling the components in the green state, and curing the green state in its final shape. In some embodiments, 3-D printing an article of footwear, or component thereof, can comprise 3-D printing multiple components in an intermediate green state, expanding and/or assembling the components in the green state, and curing the green state in its final shape.

Techniques for producing an intermediate green state object from resins by additive manufacturing are known. Suitable techniques include bottom-up and top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the additive manufacturing step can be carried out by one of the family of methods sometimes referred to as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, Science 347, 1349-1352 (2015); and in R. Janusziewcz et al., Layerless fabrication with continuous liquid interface production, Proc. Natl. Acad. Sci. USA 113, 11703-11708 (Oct. 18, 2016). Other examples of methods and apparatus for carrying out particular embodiments of CLIP include, but are not limited to: Batchelder et al., US Patent Application Pub. No. US 2017/0129169 (May 11, 2017); Sun and Lichkus, US Patent Application Pub. No. US 2016/0288376 (Oct. 6, 2016); Willis et al., US Patent Application Pub. No. US 2015/0360419 (Dec. 17, 2015); Lin et al., US Patent Application Pub. No. US 2015/0331402 (Nov. 19, 2015); D. Castanon, US Patent Application Pub. No. US 2017/0129167 (May 11, 2017). B. Feller, US Pat App. Pub. No. US 2018/0243976 (published Aug. 30, 2018); M. Panzer and J. Tumbleston, US Pat App Pub. No. US 2018/0126630 (published May 10, 2018); K. Willis and B. Adzima, US Pat App Pub. No. US 2018/0290374 (Oct. 11, 2018) L. Robeson et al., PCT Patent Pub. No. WO 2015/164234 (see also U.S. Pat. Nos. 10,259,171 and 10,434,706); and C. Mirkin et al., PCT Patent Pub. No. WO 2017/210298 (see also US Pat. App. US 2019/0160733). The disclosures of these patents and applications are incorporated by reference herein in their entirety.

While stereolithography techniques such as CLIP can be preferred, it will be appreciated that other additive manufacturing techniques, such as jet printing (see, e.g., U.S. Pat. No. 6,259,962 to Gothait and US Patent App. Ser. No. US 2020/0156308 to Ramos et al.) can also be used.

In some embodiments, any component of footwear described herein (for example, the upper portion 102, the midsole portion 104, the outsole portion 106, the tongue portion 108, etc.) can comprise a three-dimensional mesh comprising a plurality of interconnected unit cells. In some embodiments, multiple components are parts of footwear described herein can comprise a three-dimensional mesh comprising a plurality of interconnected unit cells, with each unit cell comprising a plurality of unit cell struts defining a three-dimensional structure and a plurality of nodes at which one or more unit cell struts are connected. As a non-limiting example shown in FIG. 1, upper portion 102 can comprise a three-dimensional mesh 101 comprising a plurality of interconnected unit cells 118 comprising a plurality of unit cell struts 112 defining a three-dimensional structure and a plurality of nodes 116 at which one or more unit cell struts 112 are connected.

As used herein, the term three-dimensional mesh refers to a three-dimensional structure comprising a plurality of unit cells 118 arranged in a web-like structure or a lattice structure. The web-like or lattice structure of a three-dimensional mesh comprises interconnected structural members (for example struts 112 or ribbons) defining the plurality of unit cells 118. In embodiments comprising struts 112, the struts 112, and thus the unit cells 118, are connected at nodes 116. For example, the struts 112 are connected at nodes 116 and define unit cells 118 arranged in a lattice configuration. In some embodiments, the plurality of interconnected unit cells 118 can be arranged in a regular or repeating lattice configuration. In some embodiments, a three-dimensional mesh 101 can be an additivity manufactured (3-D printed) structure. Exemplary lattice configurations include, but are not limited to, basic cubic lattices, body-centered cubic lattices, face-centered cubic lattices, and modified lattices based on these lattice types. Exemplary lattice configurations include, but are not limited to the lattice structures described in U.S. patents application Ser. Nos. 17/069,623 and 18/313,135, which are hereby incorporated by reference in their entireties.

The unit cells 118 can have various dimensions and geometries. Further, the unit cells 118 within a three-dimensional mesh can be the same or may differ. Thus, a three-dimensional mesh can include unit cells 118 of different dimensions or geometries. The three-dimensional shape of a unit cell 118 can be defined by a plurality of struts 112 connected to one another at the nodes 116. In such embodiments, each of the unit cells 118 can have a base geometry (for example, three-dimensional shape, connection, and arrangement of the struts 112 defining the unit cell 118). The base geometry of the unit cell 118 may be, but is not limited to, a dodecahedron (e.g., rhombic), a tetrahedron, an icosahedron, a cube, a cuboid, a prism, or a parallelepiped. Each node 116 can connect two or more of the struts 112.

In some embodiments, the unit cells 118 can comprise a solid representation of a repeating implicit surface of a lattice structure. In such embodiments, the unit cells 118 can comprise a "base surface geometry" defined by the base three-dimensional shape of a body formed by one or more ribbons (walls) of material that define a solid representation of an implicit surface for a full unit cell 118. In some embodiments, the implicit surface can be a periodic implicit surface such that the base surface geometry of each unit cell 118 contacts the base surface geometry of at least some adjacent unit cells 118 to create a lattice. One example of a suitable periodic surface is a gyroid, but any type of suitable periodic surface can be used.

Herein, a solid representation of an implicit surface refers to a solid object following the shape of an implicit surface. Whereas an actual implicit surface has no thickness, a solid representation of an implicit surface has a thickness on one or both sides of the actual implicit surface in a three dimensional space. The thickness gives the solid representation volume, meaning the solid representation can be built as a physical object from physical material. The added thickness or thicknesses can be uniform, or at least approximately uniform notwithstanding fillets or local deformities, and thin in comparison to the overall size of the represented implicit surface. In some embodiments, the relative density of a unit cell of the solid representation can be from 5% to 30%, from 5% to 40%, from 10% to 25%, or from 15% to 20%. The term "relative density" as used herein refers to an amount of a unit cell occupied by solid material as a percentage of a total volume of the unit cell.

In some embodiments, the implicit surfaces can be created using a combination of random Fourier series functions, in which linear and or nonlinear coefficient as well as linear and nonlinear variables inside sine and cosine terms over the x, y and z space are iterated to generate the functions. The resulting unit cells can have different planes of symmetry, such as, in various examples, zero planes of symmetry, one plane of symmetry, or more than one plane of symmetry. The function can be derived in a way that satisfies the periodicity of the unit cell. Criteria for the selection of an applicable implicit surface within the design space domain can include any one or any combination of number of terms in the equation, number of connected components, the edge boundary length, surface area, and volume fraction.

Additive manufacturing processes can create components that are a single piece. For example, an additive manufacturing process can create components that are continuous and do not comprise any seams, joints, or other types of discontinuities. Thus, at least one of the parts or portions of articles of footwear described herein (for example, the upper portion 102, the midsole portion 104, the outsole portion 106, etc.) can be a single piece.

As described herein, article of footwear 100 can comprise an assembly of modular parts. For example, in some embodiments, article of footwear 100 can comprise an assembly of modular parts that can allow the wearer to customize each portion of the article of footwear 100. For example, a wearer can customize two or more of an upper portion 102, a midsole portion 104, an outsole portion 106, a tongue portion 108, and a support member 234 to have shapes, sizes, colors, and performance characteristics that meet desired requirements of the wearer. For example, the wearer can choose to customize the portions of the article of footwear 100 to be softer and more flexible for greater comfort. The wearer can also choose to customize the portions of the article of footwear 100 to be stiffer for better performance when, for example, running, jumping, etc. In some embodiments, each of the portions of the article of footwear 100 can be formed of smaller parts that can each be customized according to the preferences of the wearer. For example, the midsole portion 104 can be formed from two or more separate parts that can be assembled using connectors as described above. Each of the two or more separate parts can be customized to have different characteristics according to desired preferences of the wearer.

Figure 2:
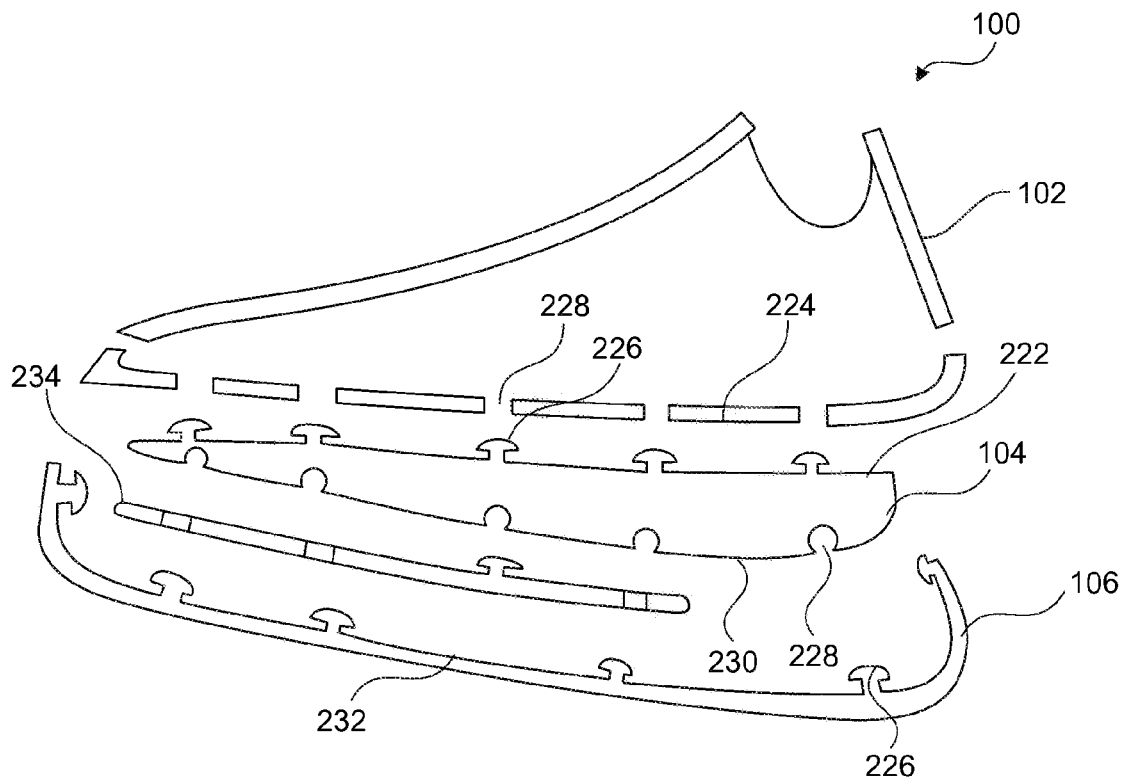
FIG. 2 shows an exploded view of an article of footwear according to some embodiments.

FIG. 2 shows an exploded view of article of footwear 100 according to some embodiments. The midsole portion 104 can comprise an upper facing surface 222 that faces away from, for example, the outsole portion 106. The upper portion 102 can comprise a ground facing surface 224 opposing the upper facing surface 222. For example, the upper facing surface 222 and the ground facing surface 224 can be positioned across from each other such that the upper facing surface 222 and the ground facing surface 224 are configured to mate when the upper portion 102 and the midsole portion 104 are coupled.

In some embodiments, the midsole portion 104 can comprise a first connector 226 that can couple the midsole portion 104 to the upper portion 102. The first connector 226 can be integrally formed with the midsole portion 104. For example, the first connector 226 can be formed using an additive manufacturing process during forming of the midsole portion 104 using the same additive manufacturing process. Thus, the first connector 226 and the midsole portion 104 can form a seamless structure with a continuous transition between the midsole portion 104 and the first connector 226. In some embodiments, the first connector 226 can extend from the upper facing surface 222 toward the upper portion 102. In some embodiments, the first connector 226 can be a first connector 326 as described herein. In some embodiments, the first connector 226 can be a first connector 426 as described herein.

In some embodiments, the upper portion 102 can comprise a second connector 228 that can couple the midsole portion 104 to the upper portion 102. The second connector 228 can be integrally formed with the upper portion 102. For example, the second connector 228 can be formed using an additive manufacturing processing during forming of the upper portion 102 using the same additive manufacturing process. Thus, the second connector 228 and the upper portion 102 can form a seamless structure with a continuous transition between the upper portion and the second connector 228. In some embodiments, the second connector 228 can be recessed from the ground facing surface 224 and can extend away from the midsole portion 104. In some embodiments, the second connector 228 can be an aperture extending entirely through the ground facing surface 224 and can be sized to receive the first connector 226. In some embodiments, the second connector 228 can be an aperture extending partially through the ground facing surface 224 and can be sized to receive the first connector 226. For example, the second connector 228 can be a pocket or slot sized to receive the first connector 226. In some embodiments, the second connector 228 can be a second connector 328 as described herein. In some embodiments, the second connector 228 can be a second connector 428 as described herein.

In some embodiments, the first connector 226 can engage the second connector 228 to mate the upper facing surface 222 and the ground facing surface 224. For example, the first connector 226 can extend into the second connector 228 to draw the upper facing surface 222 and the ground facing surface 224 closer to each other to mate the upper facing surface 222 and the ground facing surface 224. In some embodiments, the first connector 226 can engage the second connector 228 via a press fit, friction fit, or any other type of fit in which a dimensional mismatch causes one or both of the connectors to deform during engagement.

In some embodiments, the upper facing surface 222 and the ground facing surface 224 can mate when the upper facing surface 222 and the ground facing surface 224 directly contact each other. In some embodiments, the upper facing surface 222 and the ground facing surface 224 can mate when the upper facing surface 222 and the ground facing surface 224 indirectly contact each other. For example, an intermediate element can be disposed between the upper facing surface 222 and the ground facing surface 224, and the upper facing surface 222 and the ground facing surface 224 can mate when both the ground facing surface 224 and the upper facing surface 222 contact the intermediate element. In some embodiments, the intermediate element can be an adhesive disposed between the upper facing surface 222 and the ground facing surface 224.

In some embodiments, the relative positions of the first connector 226 and the second connector 228 can be reversed. For example, the first connector 226 can be integrally formed with the upper portion 102 and extend from the ground facing surface 224 toward the upper facing surface 222. Similarly, the second connector 228 can be integrally formed with the midsole portion 104 and can be recessed from the upper facing surface 222 and can extend away from the upper portion 102.

In some embodiments, the article of footwear 100 can comprise more than one of the first connector 226 and the second connector 228. In some embodiments, the upper portion 102 can comprise a plurality of the first connectors 226 and the midsole portion 104 can comprise a plurality of the second connectors 228. In some embodiments, the upper portion 102 can comprise a plurality of the second connectors 228 and the midsole portion 104 can comprise a plurality of the first connectors 226. In some embodiments, the upper portion 102 can comprise at least one of the first connectors 226 and a least one of the second connectors 228, and the midsole portion 104 can comprise a corresponding at least one of the second connectors 228 and at least one of the first connectors 226 to engage the respective connectors of the upper portion 102.

In some embodiments, the midsole portion 104 can comprise at least one first connector 226 and/or at least one second connector 228 integrally formed with a ground facing surface 230 of the midsole portion 104. The ground facing surface 230 can oppose the upper facing surface 222. In some embodiments, the outsole portion 106 can comprise at least one first connector 226 and/or at least one second connector 228 integrally formed with an upper facing surface 232 of the outsole portion 106 to engage the respective connectors of the midsole portion 104. The upper facing surface 232 can oppose the ground facing surface 230. Engagement between the respective connectors integrally formed with the midsole portion 104 and the outsole portion 106 can mate the ground facing surface 230 and the upper facing surface 232. In some embodiments, the outsole portion 106 can comprise multiple outsole pieces each comprising at least one first connector 226 and/or at least one second connector 228 integrally formed with an upper facing surface 232 of each respective outsole piece to engage the respective connectors of the midsole portion 104. Engagement between the respective connectors integrally formed with the midsole portion 104 and the outsole portion 106 pieces can mate the ground facing surface 230 and the upper facing surface 232 of each respective outsole piece.

In some embodiments, the article of footwear 100 can comprise one or more support members 234. In some embodiments, support member(s) 234 can be located between the midsole portion 104 and the outsole portion 106. In some embodiments, a support member 234 can comprise one or more first connectors 226 and/or one or more second connectors 228. In some embodiments, the one or more first connectors 226 and/or the one or more second connectors 228 can be integrally formed with the support member 234. In such embodiments, support member(s) 234 can be coupled to the midsole portion 104 based on engagement between the respective connectors of support member(s) 234 and the midsole portion 104. Additionally or alternatively, support member(s) 234 can be coupled to the outsole portion 106 based on engagement between the respective connectors of the support member 234 and the outsole portion 106. In some embodiments, a support member 234 can define an aperture that receives a first connector 226 or second connector 228.

In some embodiments, the support member(s) 234 can be stronger and/or stiffer than the materials used for the other portions of the article of footwear 100 (for example, the upper portion 102, the midsole portion 104, the outsole portion 106, etc.) to provide support for the foot of the wearer. In some embodiments, the support member(s) 234 can comprise a material such as, for example, a nylon polymer, a fiber reinforced composite material, or a metal, such as aluminum, steel, or titanium. In some embodiments, support member(s) 234 can comprise a shank, a torsion bar, a rigid plate, or a combination thereof. In some embodiments, support member(s) 234 can comprising longitudinal support members 1251 and/or transverse support members 1257 as described herein.

Figure 3A:
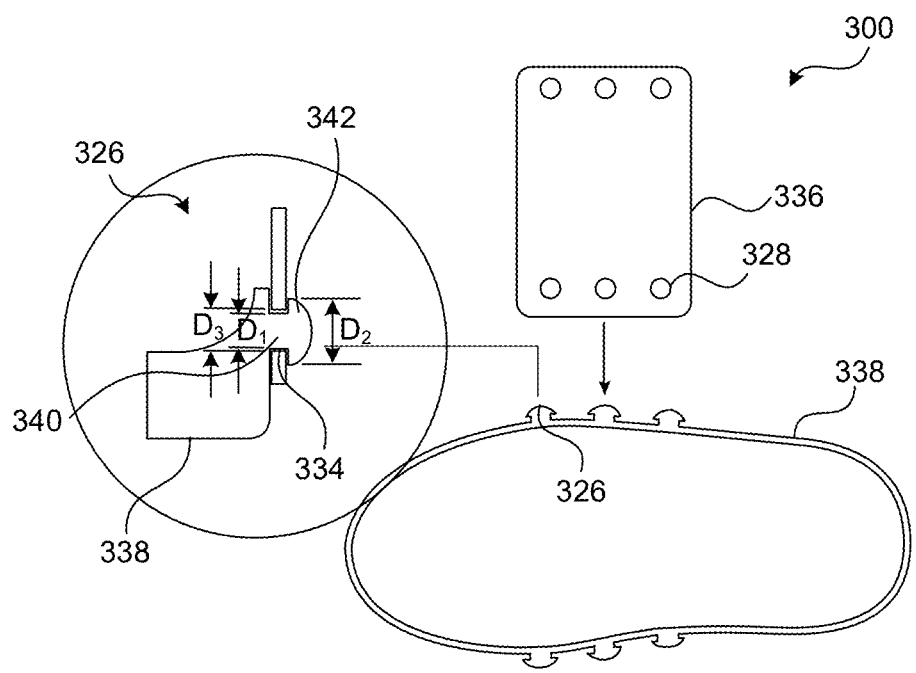
FIGS. 3A-3B show connectors to couple portions of an article of footwear according to some embodiments.
Figure 3B:
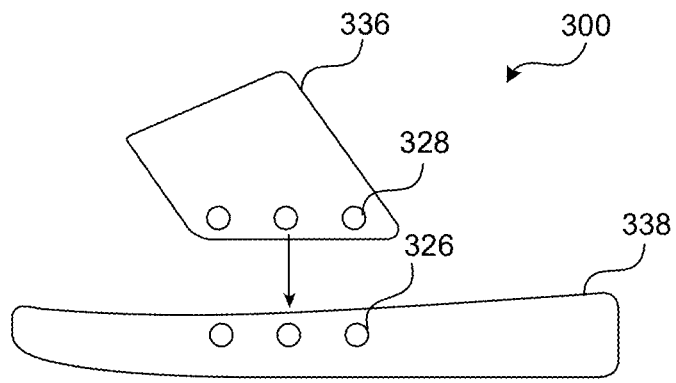

FIGS. 3A-3B show connectors for coupling portions of an article of footwear 300, according to some embodiments. The article of footwear 300 can be any type of footwear a wearer can secure to a foot to protect and cushion the foot. Though shown in FIGS. 3A-3B as a slide sandal, the article of footwear 300 can also be a shoe, a boot, a sport-specific shoe (for example, baseball cleats, soccer cleats, golf shoes, etc.), etc. The article of footwear 300 can comprise an upper portion 336 to cover a top portion of the foot of the wearer. The article of footwear 300 can comprise a sole portion 338 to support a foot of the wearer. One or both of the upper portion 336 and the sole portion 338 can be a single, integrally formed part. In some embodiments, one or both of the upper portion 336 and the sole portion 338 can be formed with an additive manufacturing process.

The sole portion 338 can comprise a first connector 326. In some embodiments, the first connector 326 can be integrally formed with the sole portion 338. For example, the first connector 326 can be formed during forming of the sole portion 338 with an additive manufacturing process. The upper portion 336 can comprise a second connector 328. In some embodiments, the second connector 328 can be integrally formed with the upper portion 336. For example, the second connector 328 can be formed during forming of the upper portion 336 with an additive manufacturing process.

In some embodiments, the first connector 326 can comprise a post 340 that extends from the sole portion 338. The first connector 326 can comprise an end portion 342 coupled to the post 340 such that the post 340 is disposed between the end portion 342 and the sole portion 338. In some embodiments, the post 340 comprises a first dimension $D_1$. In embodiments in which the post 340 has a circular cross-sectional shape, $D_1$ can be a diameter. In embodiments in which the post 340 has another cross-sectional shape (for example, square, triangular, hexagonal, or any other geometric or irregular shape), $D_1$ can represent the largest dimensional value of the cross-sectional shape. For example, if the post has a rectangular cross-sectional shape, $D_1$ can represent the value of the length of the longest leg of the rectangular cross-sectional shape.

In some embodiments, the end portion 342 comprises a second dimension $D_2$. In embodiments in which the end portion 342 has a circular cross-sectional shape, $D_2$ can be a diameter. In embodiments in which the post 340 has another cross-sectional shape, $D_2$ can represent the largest dimensional value of the cross-sectional shape, as described above. In some embodiments, $D_2$ can be larger than $D_1$.

In some embodiments, the second connector 328 can be recessed from a surface of the upper portion 336. In some embodiments, the second connector 328 can extend entirely through the upper portion 336 such that the second connector 328 can comprise an opening through the upper portion 336. In some embodiments, the second connector 328 can extend partially through the upper portion 336 such that the second connector 328 can comprise a pocket formed within the upper portion 336. In some embodiments, the second connector 328 can comprise an opening having a third dimension $D_3$. In embodiments in which the second connector 328 comprises a circular opening, $D_3$ can be a diameter. In embodiments in which the second connector comprises another shape, $D_3$ can represent the largest dimensional value of the cross-sectional shape, as described above.

In some embodiments, $D_3$ can be smaller than $D_2$ and larger than $D_1$. In some embodiments, the end portion 342 can extend into or through the second connector 328 to couple the upper portion 336 and the sole portion 338. For example, the end portion 342 can deform as the end portion 342 engages with the second connector 328 and can return to is regular shape after the end portion 342 has passed through the second connector 328.

In some embodiments, the upper portion 336 and the sole portion 338 can be expanded after being coupled by the first connector 326 and the second connector 328. For example, the upper portion 336 and the sole portion 338 can be coupled by the first connector 326 and the second connector 328 when at least one of the upper portion 336 or the sole portion 338 are in the green state. After coupling the upper portion 336 and the sole portion 338, the upper portion 336 and the sole portion 338 can be heated to cause one or both of the upper portion 336 or the sole portion 338 to expand from the green state to the final state. In some embodiments, the expansion of the upper portion 336 and the sole portion 338 coupled by the first connector 326 and the second connector 328 can be performed as described in method 1473.

Connection between a first connector 326 and a second connector 328 can create an interlocking fit at a joint 334 between the upper portion 336 and the sole portion 338. In some embodiments, expansion of one or more of the upper portion 336 or the sole portion 338 can cause one or more of the first connector 326 or the second connector 328 to expand to create an interlocking fit at a joint 334 between the upper portion 336 and the sole portion 338. In such embodiments, the interlocking fit between the upper portion 336 and the sole portion 338 can limit or prevent separation of the upper portion 336 from the sole portion 338. Any two connectors described herein (for example, connectors 226 and 228) can form joint 334 comprising an interlocking fit.

In some embodiments, the joint 334 can comprise a cured resin. For example, an uncured resin can be applied to the joint 334 before or after joining the first connector 326 and the second connector 328. As described herein, during heating (for example, when moving from a green state to the final cured state during method 1473), the uncured resin can cure to the cured resin to further secure the interlocking fit between the upper portion 336 and the sole portion 338. In some embodiments, the cured resin comprises the same material as one or both of the upper portion 336 and the sole portion 338.

The first connector 326 and the second connector 328 can be implemented in any embodiments of articles of footwear described herein, and are not limited to the article of footwear 300. Similarly, any two connectors described herein (for example, connectors 226 and 228) can form joint 334 comprising cured resin made of the same material as one or both of the parts coupled at the joint 334.

Figure 4:
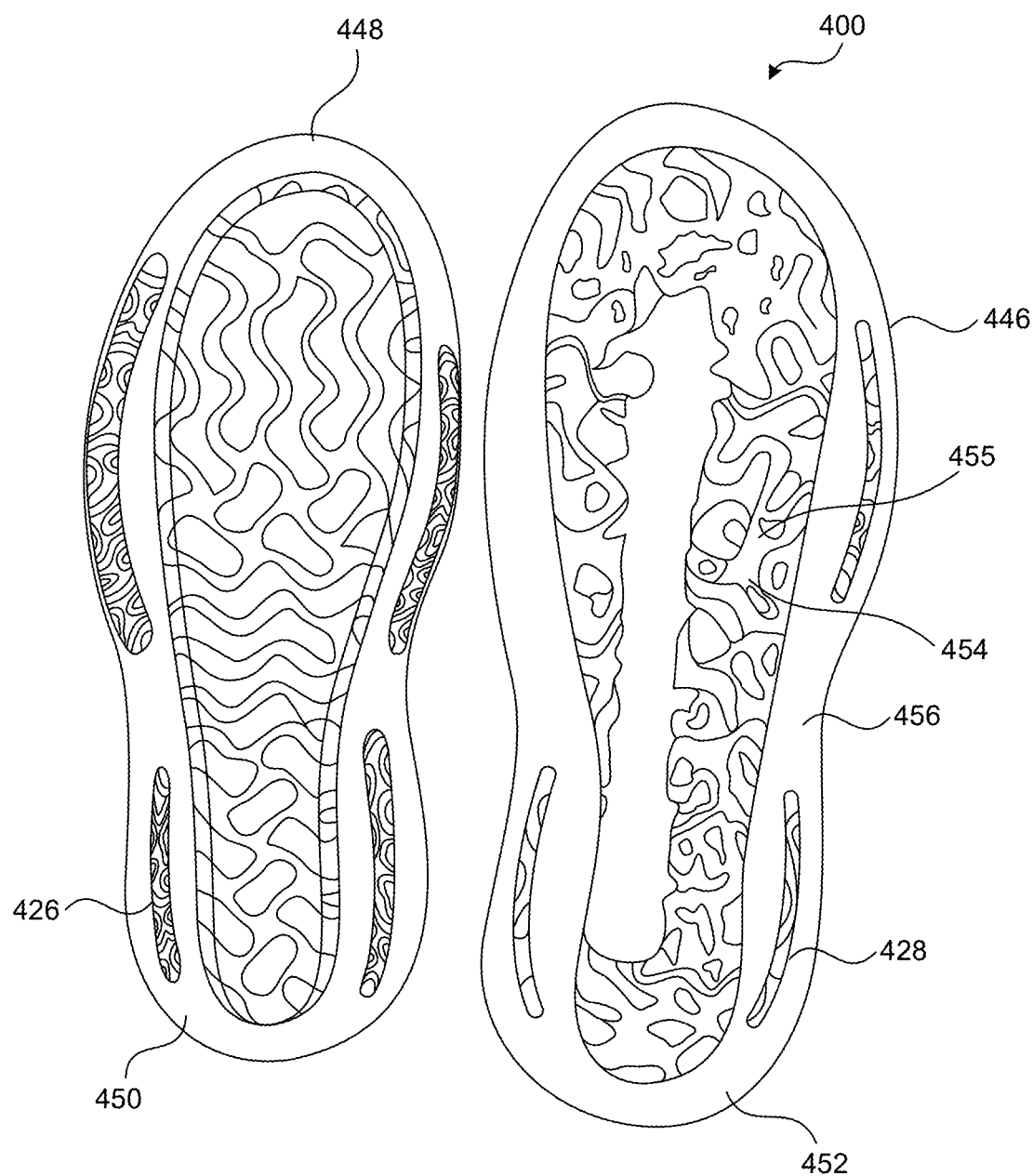
FIG. 4 shows connectors to couple portions of an article of footwear according to some embodiments.

FIG. 4 shows connectors to couple portions of an article of footwear 400 according to some embodiments. The article of footwear 400 can be any type of footwear. Though shown in FIG. 4 as a shoe, the article of footwear 400 can also be a sandal, a boot, a sport-specific shoe (for example, baseball cleats, soccer cleats, golf shoes, etc.), etc. In some embodiments, the article of footwear 400 can be similar to the article of footwear 100 of FIGS. 1-2. The article of footwear 400 can comprise an upper portion 446 and a sole portion 448. In some embodiments, one or both of the upper portion 446 and the sole portion 448 can be formed with an additive manufacturing process.

The sole portion 448 can comprise one or more first connectors 426. In some embodiments, the first connector(s) 426 can be integrally formed with the sole portion 448 as previously described. In some embodiments, the first connector(s) 426 can comprise a tab extending from an upper facing surface 450 of the sole portion 448.

The upper portion 446 can comprise one or more second connectors 428. In some embodiments, the second connector(s) 428 can be integrally formed with the upper portion 446 as previously described. In some embodiments, the second connector(s) 428 can comprise a slot formed in a ground facing surface 452 of upper portion 446 and into a first connector 426 on sole portion 448.

In some embodiments, the first connector 426 engages with the second connector 428 to mate the upper facing surface 450 and the ground facing surface 452, thereby coupling the upper portion 446 and the sole portion 448. In some embodiments, the first connector 426 can engage the second connector 428 via a press fit, friction fit, or any other type of fit in which a dimensional mismatch causes one or both of the connectors to deform during engagement. For example, the first connector 426 can have a dimension that is larger than a dimension of the second connector 428. During engagement between the first connector 426 and the second connector 428, the first connector 426 can compress and the second connector 428 can expand, thereby creating an interlocking fit between the upper portion 446 and the sole portion 448. In some embodiments, the first connector 426 and the second connector 428 can create a joint 334 as described herein.

In some embodiments, one or more of the upper portion 446 and the sole portion 448 can expand from a green state to a final state during heating, as described in method 1473. In some embodiments, there may not be a dimensional interference between the first connector 426 and the second connector 428 when in the green state. Instead, one or more of the first connector 426 or the second connector 428 can expand during heating to cause engagement between the first connector 426 and the second connector 428 to create the interlocking fit between the upper portion 446 and the sole portion 448.

The first connector 426 and the second connector 428 can be implemented in any embodiments of articles of footwear described herein, and are not limited to the article of footwear 400. Similarly, connectors 426 and 428 can comprise any other set of connectors as described herein (for example connectors 226 and 228).

In some embodiments, upper portion 446 can define a strap, a lace support, a cage, a flange, a heel counter, or a sleeve extending from the sole portion 448 of the article of footwear 400. In some embodiments, upper portion 446 can define a strap, a lace support, a cage, a flange, a heel counter, or a sleeve extending from a midsole portion of sole portion 448. In some embodiments, as shown for example in FIGS. 4 and 5, upper portion 446 can comprise a shell 454 for receiving all or a portion of an upper 470 for the article of footwear. In such embodiments, shell 454 can extend from a rim 456 comprising ground facing surface 452.

In some embodiments, the upper 470 can comprise a textile material coupled to an interior surface 455 of the shell 454. In some embodiments, the textile material can be coupled to interior surface 455 by, for example, stitching, lacing, or adhesive bonding. Suitable materials for the textile material of upper 470 comprise any of the textile materials described herein.

In some embodiments, the upper 470 can comprise a single integrally formed part coupled to interior surface 455 of the shell 454 and/or upper facing surface 450 of sole portion 448 by one or more mechanical connectors. In such embodiments, the sole portion 448 can comprise one or more first connectors 526. In some embodiments, the first connector(s) 526 can be integrally formed with the sole portion 448 as previously described. In some embodiments, the first connector(s) 526 can comprise a hook extending from an upper facing surface 450 of the sole portion 448. Similarly, the upper portion 446 can comprise one or more first connectors 526. In some embodiments, the first connector(s) 526 can be integrally formed with the upper portion 446 as previously described. In some embodiments, the first connector(s) 526 can comprise a loop extending from interior surface 455 of the upper portion 446. In such embodiments, the upper 470 can comprise one or more second connectors 528 that engage with first connectors 526. In some embodiments, the second connector(s) 528 can be integrally formed with the upper 470. In some embodiments, the second connector(s) 528 can comprise a loop extending from an exterior interior surface 472 of upper 470.

In some embodiments, the first connectors 526 can engage with the second connectors 528 to mate the upper facing surface 450 and/or inner surface 455 to exterior surface 472 of upper 470, thereby coupling the upper 470 to the sole portion 448 and the upper portion 446. The first connector 526 and the second connector 528 can be implemented in any embodiments of articles of footwear described herein, and are not limited to the article of footwear 400. Similarly, connectors 526 and 528 can comprise any other set of connectors as described herein (for example connectors 226 and 228).

Figure 5:
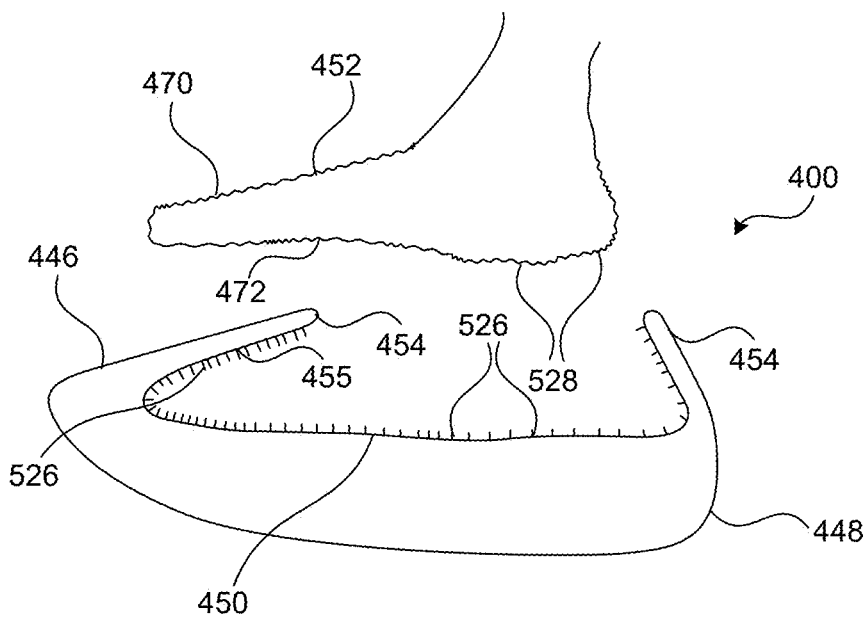
FIG. 5 shows connectors to couple portions of an article of footwear according to some embodiments.
Figure 6:
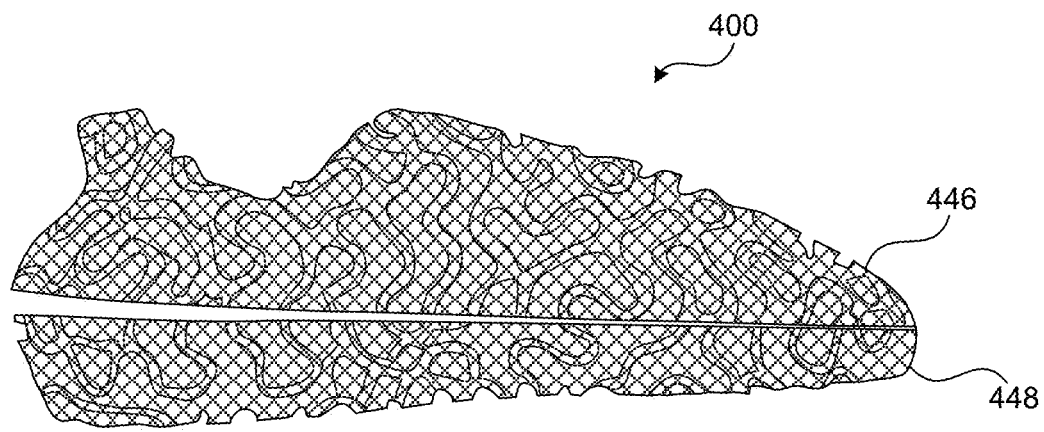
FIG. 6 shows portions of an article of footwear coupled together according to some embodiments.

In some embodiments, upper portion 446 and sole portion 448 can be formed as a single integral piece, as shown for example in FIG. 5. In some embodiments, upper portion 446 and sole portion 448 can be formed as separate pieces that are coupled together via connectors 426 and 428, as shown for example in FIG. 6.

Figure 7C:
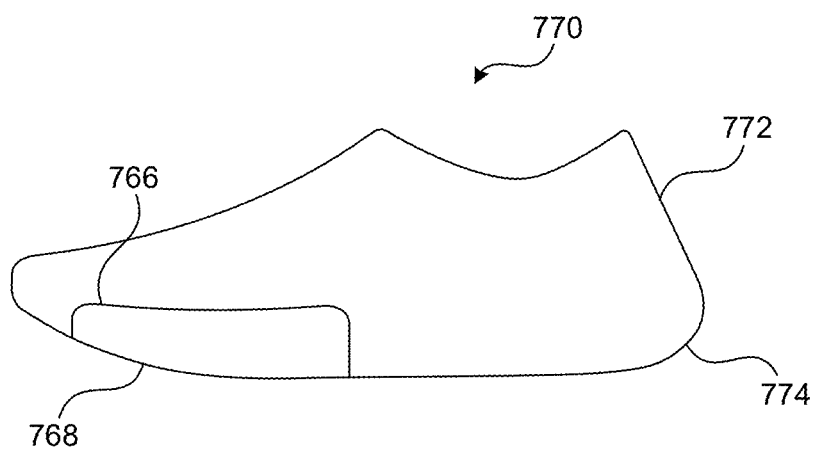

FIGS. 7A-7C show various ways to couple portions of an article of footwear, according to some embodiments. FIG. 7A shows an article of footwear 754. Though the article of footwear 754 is shown as a slide sandal, the article of footwear 754 can be any of the types of footwear described above. The article of footwear 754 can comprise an upper portion 756 and a sole portion 758. The upper portion 756 and the sole portion 758 can be coupled using any combination of the different types of connectors described above. In some embodiments, the sole portion 758 can be a single integral piece (for example, manufactured with an additive manufacturing process). In some embodiments, the sole portion 758 can be one or more of an outsole portion, a midsole portion, or a combination thereof.

In some embodiments, the sole portion 758 can comprise a shell 454 for receiving part of the upper portion 756. For example, the sole portion 758 can comprise a recessed surface 759 that is recessed from an outer surface 761 of the sole portion 758. The recessed surface 759 can be sized to receive part of the upper portion 756 such that part of the upper portion rests below the outer surface 761.

As described above, modular footwear as described herein can be customized by assembling different footwear portions. In some embodiments, different modular portions of a sole portion for an article of footwear can be assembled to form an article of footwear.

For example, FIG. 7B shows an article of footwear 760 comprising a modular sole portion 764. Though the article of footwear 760 is shown as a slipper, the article of footwear 760 can be any of the types of footwear described above. The article of footwear 760 can comprise an upper portion 762 and sole portion 764. The sole portion 764 can comprise one or more upper facing cavities 766 formed in the sole portion 764. Cavity 766 can be sized to receive a first partial midsole portion 768. For example, cavity 766 can comprise an upper facing opening into which the first partial midsole portion 768 can be inserted. First partial midsole portion 768 can comprise one or more connectors that engage corresponding connector(s) on sole portion 764 as described herein.

In some embodiments, the first partial midsole portion 768 can fill a first part of the cavity 766 and a second partial midsole portion can be inserted through the opening in the cavity 766 to fill the remainder of the cavity 766. In such embodiments, cavity 766 can be sized to receive a first partial midsole portion 768 and a second partial midsole portion. Also in such embodiments, the first partial midsole portion 768, the second partial midsole portion, and the sole portion 764 can be coupled with corresponding connectors on the first partial midsole portion 768, the second partial midsole portion, and the sole portion 764 as described herein.

Providing multiple partial midsole portions can allow for additional customization of articles of footwear according to the disclosure. For example, the wearer may want different areas of the midsole portion to have different performance or aesthetic characteristics. More specifically, the wearer may want the first partial midsole portion 768 to be stiffer than the second midsole portion, or vice versa. In some embodiments, the sole portion 764 can comprise a plurality of customizable midsole portions (for example, two, three, four, five, or more customizable portions). In some embodiments, the plurality of customizable midsole portions can be arranged in a longitudinal manner, extending from a heel portion of the article of footwear 760 toward a toe portion of the article of footwear 760. In some embodiments, the plurality of customizable midsole portions can be arranged in a lateral manner, extending from a medial portion of the article of footwear 760 to a lateral portion of the article of footwear 760. In some embodiments, the plurality of customizable midsole portions can be arranged in both the longitudinal and lateral manners.

As another example of the modularity provided by the present disclosure, FIG. 7C shows an article of footwear 770. Though the article of footwear 770 is shown as a shoe, the article of footwear 770 can be any of the types of footwear described above. The article of footwear 770 can comprise an upper portion 772 and a sole portion 774. The sole portion 774 can comprise one or more cavities 766 comprising a ground facing opening into which a partial midsole portion 768 is inserted. Partial midsole portion 768 can comprise one or more connectors that engage corresponding connector(s) on sole portion 764 as described herein.

Figure 8:
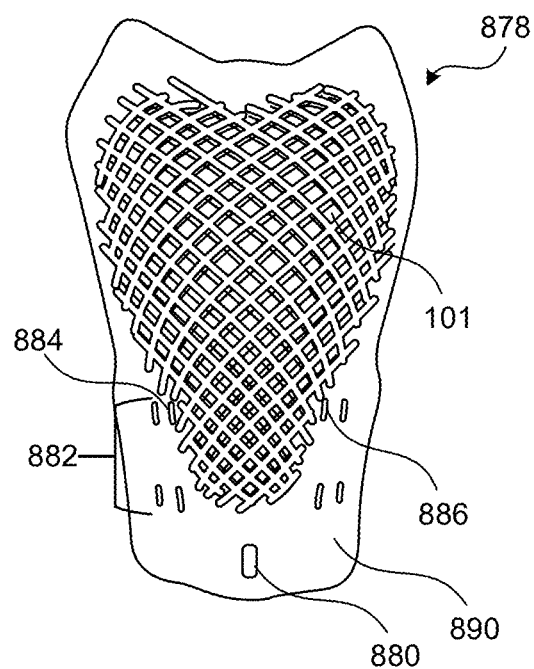
FIG. 8 shows a tongue portion for an article of footwear according to some embodiments.

FIG. 8 shows a tongue portion 878 for an article of footwear according to some embodiments. In some embodiments, the tongue portion 878 can be implemented in any of the articles of footwear disclosed herein. For example, tongue portion 878 can be tongue portion 108 shown in FIG. 1. In some embodiments, the tongue portion 878 can be a single integrally formed piece. In some embodiments, the tongue portion 878 can be manufactured using any of the additive manufacturing processes disclosed herein. In some embodiments, the tongue portion 878 can comprise a three-dimensional mesh 101.

In some embodiments, the tongue portion 878 can comprise a connector 880. The connector 880 can comprise any type of connector described herein. In some embodiments, the connector 880 can comprise an aperture extending partially or entirely through the tongue portion 878. In some embodiments, the connector 880 can comprise a post and an end portion similar to those described with reference to FIGS. 3A-3B. In some embodiments the connector 880 can comprise a tab or a slot as described with reference to FIG. 4. In some embodiments, the connector 880 can comprise a hook or a loop as described with reference to FIG. 5. In embodiments comprising the connector 880, the connector 880 can facilitate coupling of the tongue portion 878 to an upper portion of an article of footwear via connection with a corresponding connector on the upper portion as described herein.

In some embodiments, the tongue portion 878 can comprise a plurality of openings 882. The plurality of openings 882 can comprise at least a first opening 884 and a second opening 886 that extend entirely through the tongue portion 878. In some embodiments, the first opening 884 and the second opening 886 are located on opposite sides of the tongue portion 878. In some embodiments, the plurality of openings 882 can be formed in a region 890 of tongue portion 878 disposed around three-dimensional mesh 101. In such embodiments, region 890 can be devoid of unit cells defining the three-dimensional mesh 101.

Figure 9:
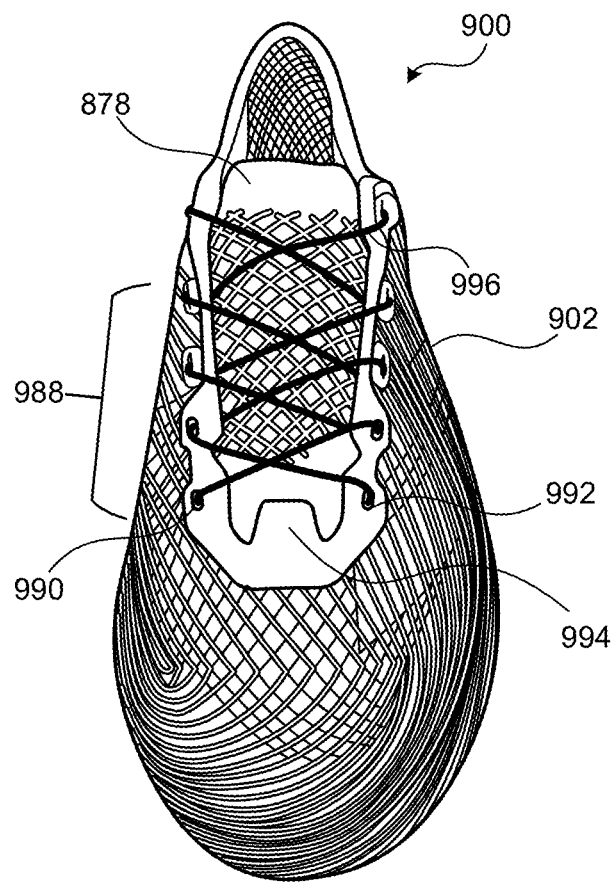
FIG. 9 shows the tongue portion of FIG. 8 coupled to an article of footwear according to some embodiments.

FIG. 9 shows the tongue portion 878 of FIG. 8 coupled to an article of footwear 900 according to some embodiments. In some embodiments, the article of footwear 900 can be similar to the article of footwear 100. For example, the article of footwear 900 can be manufactured using any of the additive manufacturing processes disclosed herein.

The article of footwear 900 can comprise an upper portion 902. The upper portion 902 can comprise plurality of openings 988 extending through the upper portion 902. The plurality of openings 988 can comprise at least a first opening 990 and a second opening 992 that extend entirely through the upper portion 902. In some embodiments, the plurality of openings 988 can correspond to the plurality of openings 882 of the tongue portion 878 to facilitate coupling of the tongue portion 878 to the upper portion 902. For example, a shoelace 996 can extend through the plurality of openings 988 and the plurality of openings 882 to couple the tongue portion 878 to the upper portion 902. In some embodiments, the shoelace 996 can extend through the first opening 884 and the first opening 990 on a first side of the footwear 900 (for example, one of a lateral side or a medial side), and the shoelace 996 can extend through the second opening 886 and the second opening 992 on a second side of the footwear 900 (for example, the other of the lateral side or the medial side).

In some embodiments, the tongue portion 878 and the upper portion 902 can be coupled using the connector 880. For example, the upper portion 902 can comprise a connector 994 that corresponds to the connector 880 such that the connector 880 and the connector 994 can connect to couple the tongue portion 878 and the upper portion 902. The connector 880 and the connector 994 can comprise any of the types of connectors previously described.

In some embodiments, the tongue portion 878 can be coupled to the upper portion 902 using only the shoelace 996. In some embodiments, the tongue portion 878 can be coupled to the upper portion 902 using only the third connector 880 and the fourth connector 994. In some embodiments, the tongue portion 878 can be coupled to the upper portion 902 using a combination of the shoelace 996 and the third connector 880 and the fourth connector 994.

In some embodiments, an article of footwear described herein can comprise one or more textile portions. In such embodiments, textile portion(s) may not be produced using an additive manufacturing process. The textile portion(s) can comprise one or more textile materials. In some embodiments, the textile material can be a non-woven, woven, braided, or knitted fabric material. Exemplary fabric materials comprise, but are not limited to, thermoplastic polyurethane (TPU), polyester, polyamide, polyethylene (PE), PE foam, polyurethane (PU) foam, nylon, ultra-high molecular weight polyethylene (for example, DYNEEMA® (a type of ultra-high molecular weight polyethylene)), carbon fiber, KEVLAR® (a type of para-aramid), synthetic spider silk, cotton, wool, natural or artificial silk, polyethersulfone (PES), ELASTAN® (a polyether-polyurea copolymer), or a blend of two or more of these materials. In some embodiments, the textile material can be a polymeric sheet or film, for example, a TPU sheet or film. In some embodiments, the textile material can be a mesh material.

In some embodiments, a tongue portion, for example tongue portion 108, can comprise a textile portion as described herein. In some embodiments, an article of footwear can comprise a lace support comprising a textile portion as described herein. In some embodiments, an article of footwear can comprise a strap comprising a textile portion as described herein. In such embodiments, the textile material(s) can be coupled to modular portions of the article of footwear in a variety of ways.

Figure 10A:
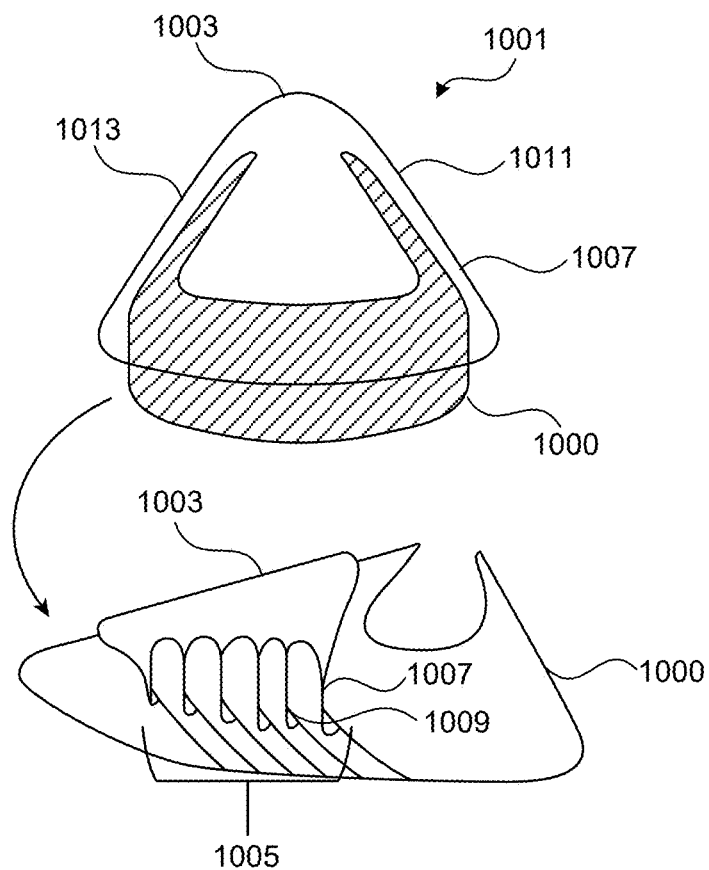
FIGS. 10A-10B show ways to couple portions of an article of footwear, according to some embodiments.
Figure 10B:
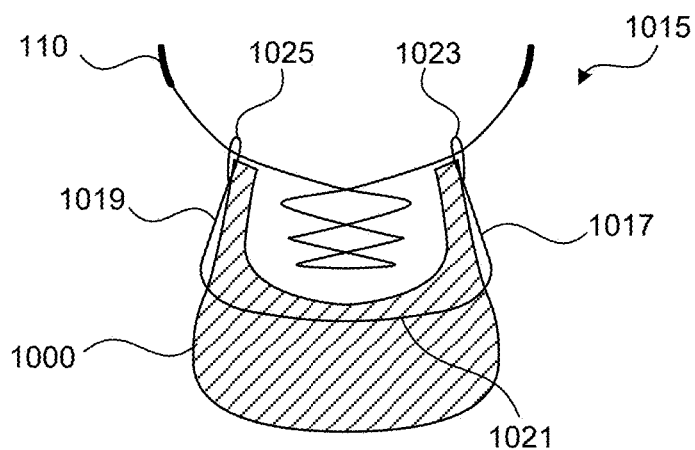

For example, FIGS. 10A-10B show multiple ways to couple textile portions to an article of footwear 1000 according to some embodiments. In some embodiments, the article of footwear 1000 can be similar to the article of footwear 100.

As shown in FIG. 10A, a textile portion 1001 can comprise an upper portion 1003. In some embodiments, the upper portion 1003 can comprise or can cover a tongue portion (for example, tongue portion 108 or tongue portion 878). The textile portion 1001 can comprise a plurality of laces 1005. Laces 1005 can comprise one or more shoe laces, one or more straps, or one or more cords.

The plurality of laces 1005 can comprise a first lace 1007 and a second lace 1009. The first lace 1007 can extend through a first opening in the article of footwear 1000. In some embodiments, the first opening extends laterally through one or more of a midsole portion (for example, midsole portion 104), an outsole portion (for example, outsole portion 106), or a support member (for example, support member 234) such that the first lace 1007 can extend entirely through the article of footwear 1000 from a lateral side to a medial side of article of footwear 1000. In some embodiments, the first opening can be defined by the unit cells 118 of a three-dimensional mesh 101 of the article of footwear 1000. For example, the first opening can be defined by the unit cells 118 of a three-dimensional mesh 101 of a midsole portion 104 of footwear 1000. In some embodiments, the second lace 1009 can extend through a second opening in the article of footwear 1000. Like the first opening, the second opening can extend laterally through one or more of the midsole portion, the outsole portion, or the support member. In some embodiments, the second opening can be defined by the unit cells 118 of a three-dimensional mesh 101 of article of footwear 1000. For example, the second opening can be defined by the unit cells 118 of a three-dimensional mesh 101 of a midsole portion 104 of article of footwear 1000.

In some embodiments, a first end 1011 of each of the plurality of laces 1005 can be connected to a first side of the upper portion 1003 and a second end 1013 of each of the plurality of laces 1005 can be connected to a second, opposite side of the upper portion 1003. In some embodiments, the second end 1013 can be releasably coupled to upper portion 1003 such that the second end 1013 can be decoupled from the upper portion 1003. In some embodiments, the releasable coupling between upper portion 1003 and second end 1013 can comprise a coupling that allows a wearer to tighten or loosen upper portion 1003 on article of footwear 1000.

In some embodiments, as shown for example, in FIG. 10B, a textile portion 1015 can comprise a first side portion 1017, a second side portion 1019, and a connecting portion 1021 that connects the first side portion 1017 to the second side portion 1019. In some embodiments, the connecting portion 1021 can extend laterally between one or more of an upper portion (for example, upper portion 102), a midsole portion (for example, midsole portion 104), an outsole portion (for example, outsole portion 106), or a support member (for example, support member 234). In such embodiments, connecting portion 1021 can be sandwiched between two of an upper portion, a midsole portion, an outsole portion, or a support member. In some embodiments, connecting portion 1021 can comprise one or more openings that receive a connector (for example, first connector 226) on an upper portion, a midsole portion, an outsole portion, or a support member. In such embodiments, connecting portion 1021 can be coupled to footwear 1000 via an interlocking connection as described in reference to FIG. 11 herein.

In some embodiments, each of the first side portion 1017, the second side portion 1019, and the connecting portion 1021 can comprise the same material. In some embodiments, at least two of the first side portion 1017, the second side portion 1019, or the connecting portion 1021 comprise the first side portion 1017 and the second side portion can comprise the same material. In some embodiments, each of the first side portion 1017, the second side portion 1019, and the connecting portion 1021 can comprise different materials. In some embodiments, the first side portion 1017 and the second side portion 1019 can comprise different aesthetic designs (for example, different colors, patterns, textures, etc.).

In some embodiments, the first side portion 1017 can comprise one or more first loops 1023 and the second side portion 1019 can comprise one or more second loops 1025. In such embodiments, a shoe lace (for example shoelace 110) can be looped through the first loop(s) 1023 and the second loop(s) 1025 such that and the wearer can tighten the article of footwear 1000 using the shoelace. In some embodiments, a series of straps can be looped through the first loop(s) 1023 and the second loop(s) 1025 such that and the wearer can tighten the article of footwear 1000 using the straps.

Figure 11:
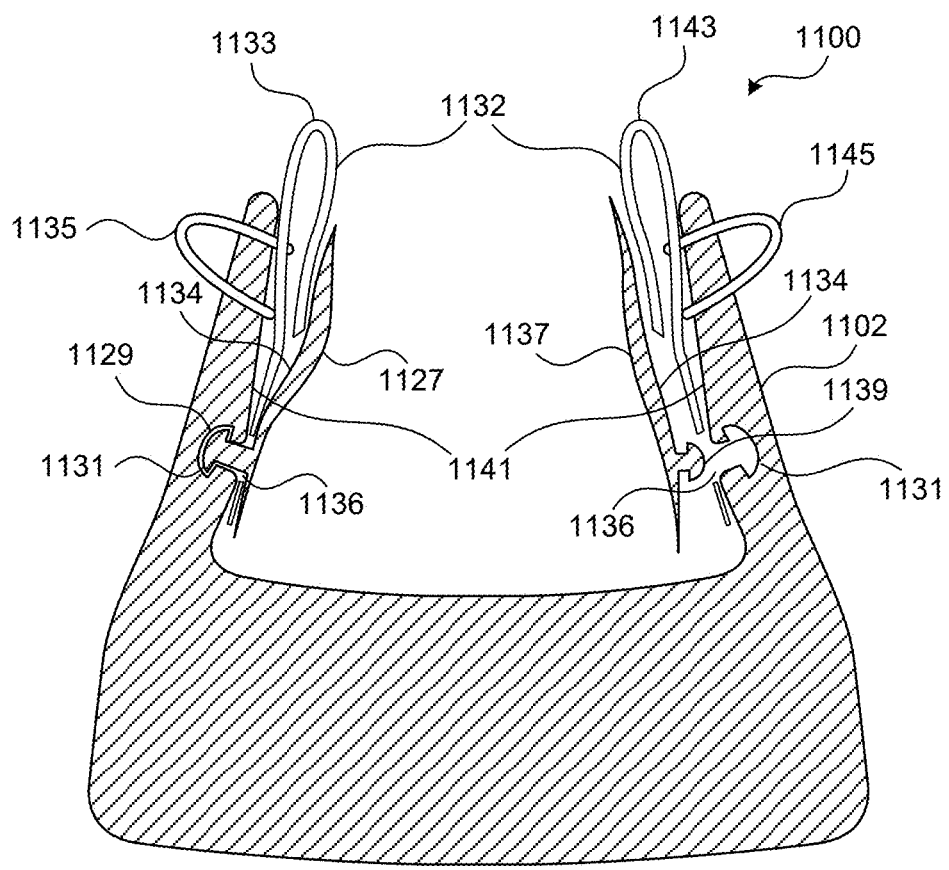
FIG. 11 shows ways to couple portions of an article of footwear according to some embodiments.

In some embodiments, a textile portion can be secured between two or more modular parts of an article of footwear as described herein. In some embodiments, a separate additively manufactured component can be secured between two or more modular parts of an article of footwear as described herein. For example, FIG. 11 shows a textile portion 1132 coupled to an article of footwear 1100 according to some embodiments. The article of footwear 1100 can be similar to any of the other articles of footwear described herein. In some embodiments, the article of footwear 1100 can be similar to the article of footwear 100.

The article of footwear 1100 comprises one or more inserts 1127, 1137. Inserts 1127, 1137 can be single integrally formed pieces as described herein for other portions of articles of footwear. In some embodiments, inserts 1127, 1137 can be formed using an additive manufacturing process as described herein. Each insert 1127, 1137 can comprise one or more connectors that couples with a corresponding connector on an upper portion 1102 (for example upper portion 102) of article of footwear 1100. For example, a first insert 1127 can comprise one or more connectors 1129 integrally formed with the first insert 1127. Connector(s) 1129 can comprise any of the types of connectors described herein. Similarly, a second insert 1137 can comprise one or more connectors 1139 integrally formed with the second insert 1137. Connector(s) 1139 can comprise any of the types of connectors described herein. In some embodiments, connectors 1129, 1139 can be formed on an exterior facing surface 1134 of the inserts 1127, 1137.

In some embodiments, the first insert 1127 and/or the second insert 1137 can define all or a portion of a strap, a lace support, a cage, a flange, a heel counter, or a sleeve on article of footwear 1100. In some embodiments, the first insert 1127 and/or the second insert 1137 can define all or a portion of a strap, a lace support, a cage, a flange, a heel counter, or a sleeve coupled to upper portion 1102 of article of footwear 1100.

The upper portion 1102 can comprise one or more connectors 1131 integrally formed with the upper portion 1102. The connector(s) 1131 can comprise any of the types of connectors described herein and can engage with corresponding connector(s) 1129 and connector(s) 1139 on inserts 1127, 1137 to couple the inserts 1127, 1137 to the upper portion 1102. In some embodiments, connectors 1131 can be formed on an interior facing surface 1141 of upper portion 1102.

In some embodiments, textile portion 1132 can comprise a first textile portion 1133 located on one of a lateral side or a medial side of the footwear 1100. In some embodiments, at least part of the first textile portion 1133 can be located between the upper portion 1102 and the first insert 1127. In such embodiments, at least part of the first textile portion 1133 can be sandwiched between an exterior facing surface 1134 of insert 1127 and interior facing surface 1141 of upper portion 1102. In some embodiments, the first textile portion 1133 can be coupled to exterior facing surface 1134 of insert 1127 and to interior facing surface 1141 of upper portion 1102 using a curable material. For example, the curable material can comprise a curable resin or other type of curable adhesive capable of coupling the first textile portion 1133 to the first insert 1127 and the upper portion 1102. In some embodiments, the curable material can be applied to the components before or after assembly and then cured to secure the components together.

In some embodiments, the first textile portion 1133 can comprise one or more openings 1136 that receives one or both of connector 1129 or connector 1131 to secure the first textile portion 1133 between the upper portion 1102 and the first insert 1127. In such embodiments, the openings 1136 can create an interlocking engagement between first textile portion 1133, upper portion 1102, and the first insert 1127. In some embodiments, the first textile portion 1133 can be secured between the upper portion 1102 and the first insert 1127 using both a curable material and one or more openings 1136. In some embodiments, the textile portion 1133 can be secured between the upper portion 1102 and the first insert 1127 using only one of the curable material or openings 1136.

In some embodiments, the first textile portion 1133 can comprise one or more loops 1135. In some embodiments, the loops 1135 can comprise cords or threads attached to textile portion 1133. In some embodiments, each respective the loop 1135 can extend through an opening in the upper portion 1102. In some embodiments, the openings that receive loops 1135 can be defined by unit cells 118 of a three-dimensional mesh 101 on upper portion 1102. In some embodiments, the loop(s) 1135 may not extend through openings in the upper portion 1102. In embodiments comprising loops 1135, a shoe lace (for example shoelace 110) can be looped through the loops 1135 and corresponding loops 1145 on second textile portion 1143 such that the wearer can tighten the article of footwear 1100 using the shoelace. In some embodiments, a series of straps can be looped through the loops 1135 and 1145 such that and the wearer can tighten the article of footwear 1000 using the straps.

In some embodiments, article of footwear 1100 can comprise a second insert 1137 and a second textile portion 1143 located on the other of the lateral side or the medial side of the upper portion 1102. In some embodiments, the second textile portion 1143 can be located between the upper portion 1102 and the second insert 1137 and can be coupled to the upper portion 1102 and the second insert 1137 in the same ways as those described with respect to the first insert 1127. For example, the second textile portion 1143 can comprise an opening 1136 received by one or both of the connector 1139 or a connector 1141. In such embodiments, the opening(s) 1136 can create an interlocking engagement between second textile portion 1143, upper portion 1102, and the second insert 1137. The second textile portion 1143 can additionally or alternatively be coupled to the second insert 1137 and the upper portion 1102 using a curable material, as described above.

In some embodiments, the second textile portion 1143 can comprise loops 1145. In some embodiments, the loop 1145 can be formed integrally with the second textile portion 1143. In some embodiments, the loops 1145 can comprise cords or threads attached to textile portion 1143. In some embodiments, each respective the loop 1145 can extend through an opening in the upper portion 1102. In some embodiments, the openings that receive loops 1145 can be defined by unit cells 118 of a three-dimensional mesh 101 on upper portion 1102. In some embodiments, the loop(s) 1145 may not extend through openings in the upper portion 1102. In embodiments comprising loops 1145, a shoe lace (for example shoelace 110) can be looped through the loops 1145 such that the wearer can tighten the article of footwear 1100 using the shoelace.

In some embodiments, the first textile portion 1133 and the second textile portion 1143 can be part of a tongue portion (for example, the tongue portion 108). In some embodiments, the first textile portion 1133 and the second textile portion 1143 can be part of a sleeve or strap coupled to upper portion 1102.

Separate components other than a textile portion 1132 can be connected to an article of footwear in the same manner as textile portion 1132. Exemplary other components comprise an additively manufactured component, a plastic insert, or a foam insert.

Figure 12:
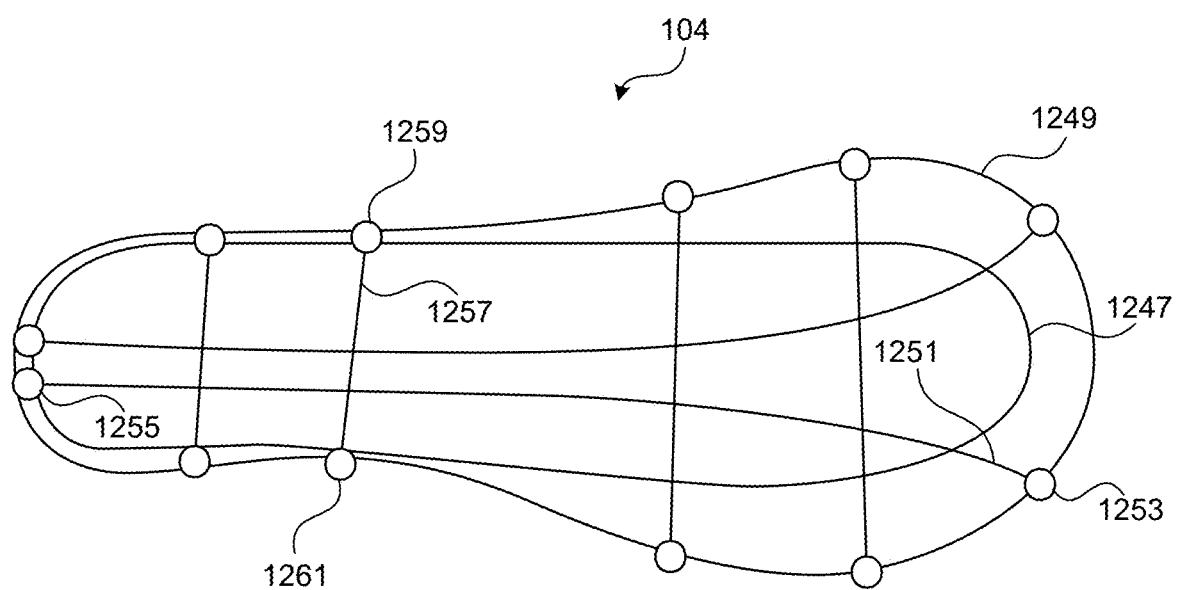
FIG. 12 shows support members coupled to a portion of an article of footwear according to some embodiments.

FIG. 12 shows support members 1251 and 1257 coupled to a portion of an article of footwear according to some embodiments. In some embodiments, the article of footwear can be article of footwear 100, and the portion of the article of footwear 100 can be the midsole portion 104. In some embodiments, the article of footwear can be any of the articles of footwear described herein, and the portion of the article of footwear can be any of the portions described herein.

In some embodiments, the midsole portion 104 can comprise a green state 1247 and a finished state 1249. The midsole portion 104 can expand from the green state 1247 to the finished state 1249 via a heating process, as described herein. In some embodiments, support members 1251 and 1257 can provide rigidity to the midsole portion 104 and/or to control expansion of the midsole portion 104 to impart a desired shape to the midsole portion 104. In such embodiments, one or more longitudinal support members 1251 and/or one or more transverse support members 1257 can be implemented to impart the desired shape. In some embodiments, the longitudinal support member(s) 1251 and the transverse support member(s) 1257 can comprise materials such fiber reinforced composite material a stiff polymers such as a nylon polymer, or a metal, such as aluminum, steel, or titanium. In some embodiments, support members 1251, 1257 can comprise a shank, a torsion bar, a rigid plate, or a combination thereof.

In some embodiments, the longitudinal support member(s) 1251 can extend from a heel portion of the midsole portion 104 to a toe portion of the midsole portion 104. In some embodiments, the longitudinal support member(s) 1251 can be approximately straight. In some embodiments, the longitudinal support member(s) 1251 can be curved.

In some embodiments, the longitudinal support member(s) 1251 can comprise a first extension 1253 located at a first end of the longitudinal support member 1251 and/or a second extension 1255 located at a second end of the longitudinal support member 1251. The first extension 1253 and the second extension 1255 can comprise a larger dimension that protrudes from the end of a longitudinal support member 1251. For example, if the longitudinal support member 1251 has a circular cross-sectional shape, a diameter of the first extension 1253 and the second extension 1255 can be greater than the diameter of the longitudinal support member 1251. First extension 1253 and second extension 1255 can comprise, for example, a knob or a head comprising a larger dimension that protrudes from the end of a longitudinal support member 1251.

In some embodiments, the midsole portion 104 in the green state 1247 can comprise one or more recesses sized to receive the longitudinal support member(s) 1251. In some embodiments, the recesses can comprise a channel formed in midsole portion 104. In some embodiments, when assembled with the midsole portion 104 in the green state 1247, the first extension 1253 and the second extension 1255 can extend beyond the boundaries of the midsole portion 104. In such embodiments, during heating of the midsole portion 104 (to move the midsole portion 104 from the green state 1247 to the finished state 1249), the midsole portion 104 can expand longitudinally such that the midsole portion 104 contacts the first extension 1253 and the second extension 1255. In some embodiments, contact between the midsole portion 104, the first extension 1253, and the second extension 1255 can constrain expansion of the midsole portion 104 in the longitudinal direction.

In some embodiments, the longitudinal support member(s) 1251 can impart a shape to the midsole portion 104. For example, in embodiments where longitudinal support member(s) 1251 are curved or comprise some other shape, midsole portion 104 can follow the shape of the longitudinal support member 1251 as the midsole portion 104 expands in the longitudinal direction.

In some embodiments, the transverse support member(s) 1257 can extend from a medial portion of the midsole portion 104 to a lateral portion of the midsole portion 104. In some embodiments, the transverse support member(s) 1257 can be approximately straight. In some embodiments, the transverse support member(s) 1257 can be curved.

In some embodiments, the transverse support member(s) 1257 can comprise a first extension 1259 located at a first end of the transverse support member 1257 and/or a second extension 1261 located at a second end of the transverse support member 1257. The first extension 1259 and the second extension 1261 can comprise a larger dimension that protrudes from the end of a transverse support member 1257. For example, if the transverse support member 1257 has a square cross-sectional shape, a cross-sectional length of the first extension 1259 and the second extension 1261 can be greater than a cross sectional length of the transverse support member 1257. First extension 1259 and second extension 1261 can comprise, for example, a knob or a head comprising a larger dimension that protrudes from the end of a transverse support member 1257.

In some embodiments, the midsole portion 104 in the green state 1247 can comprise one or more recesses sized to receive the transverse support member(s) 1257. In some embodiments, the recesses can comprise a channel formed in midsole portion 104. In some embodiments, when assembled with the midsole portion 104 in the green state 1247, the first extension 1259 and the second extension 1261 can extend beyond the boundaries of the midsole portion 104. In such embodiments, during heating of the midsole portion 104 (to move the midsole portion 104 from the green state 1247 to the state 1249), the midsole portion 104 can expand transversely such that the midsole portion 104 contacts the first extension 1259 and the second extension 1261. In some embodiments, contact between the midsole portion 104, the first extension 1259, and the second extension 1261 can constrain expansion of the midsole portion 104 in the transverse direction.

In some embodiments, the transverse support member(s) 1257 can impart a shape to the midsole portion 104. For example, in embodiments where transverse support member(s) 1257 is curved or comprises some other shape, the midsole portion 104 can follow the shape of the transverse support member 1257 as the midsole portion 104 expands in the transverse direction.

Figure 13A:
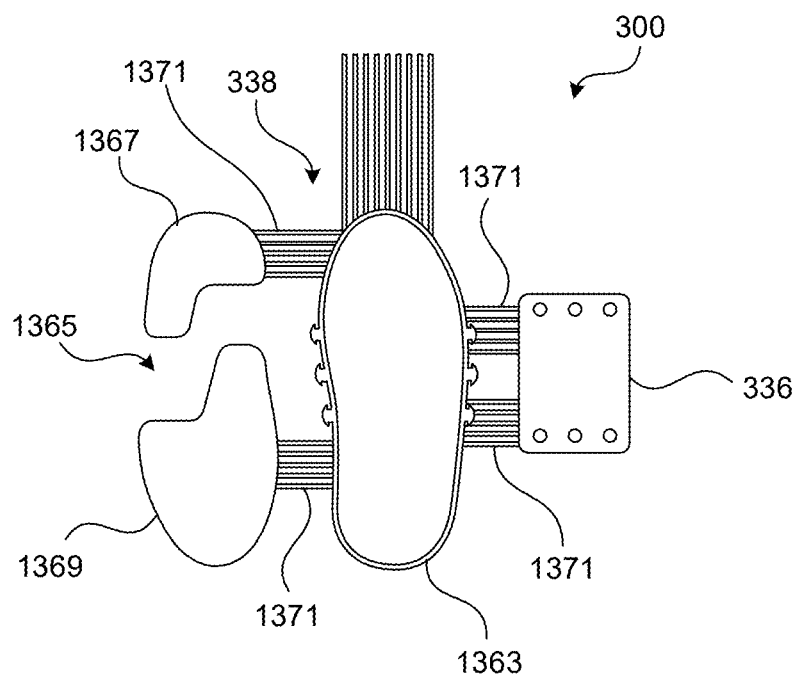
FIGS. 13A-13B illustrate a method of manufacturing an article of footwear according to some embodiments.
Figure 13B:
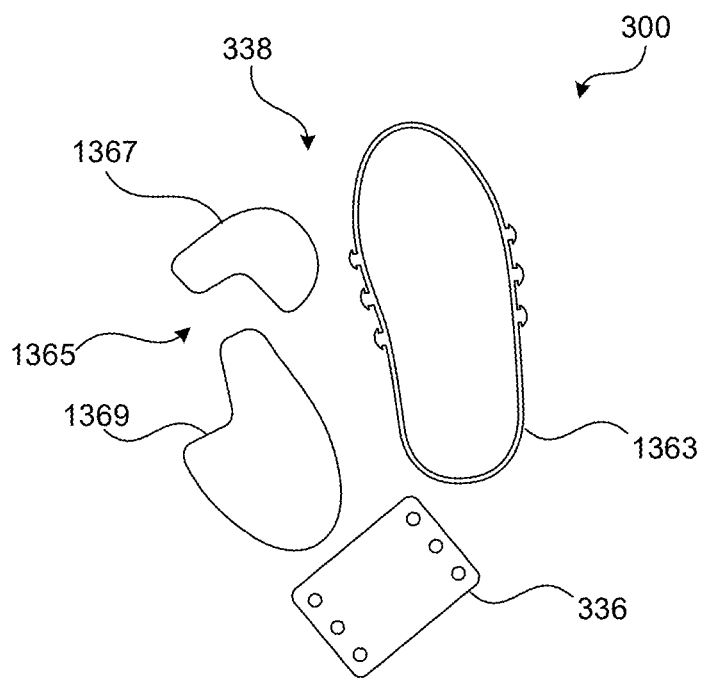

FIGS. 13A-13B illustrate a method of manufacturing an article of footwear according to some embodiments. In some embodiments, the article of footwear can be the article of footwear 300 of FIG. 3. In some embodiments, the article of footwear can be any of the articles of footwear described herein. In some embodiments, the components of the article of footwear 300 can be formed at the same time. For example, each of the components of the article of footwear 300 can be formed at the same time with the same additive manufacturing process. After forming, all of the components can be immediately assembled or transferred together to another location for assembly. Forming the components together can limit instances of components being lost prior to assembly. In some embodiments, it can be even more efficient to form all components of an article of footwear at the same time and to couple all of the components together. Forming the components coupled together can further reduce instances of lost components prior to assembly, as all components of the article of footwear are coupled together and can be transported together.

As shown in FIG. 13A, the components of the article of footwear 300 can comprise, for example, an upper portion 336 and a sole portion 338. The sole portion 338 can comprise a midsole portion 1363 and one or more partial midsole portions 1365. In some embodiments, the partial midsole portions 1365 can comprise a first midfoot portion 1367 and a second midfoot portion 1369. During an integral forming process, for example an additive manufacturing process, each of the components can be connected to at least one of the other components with one or more supports 1371. In some embodiments, the support(s) 1371 can comprise a strut or a beam connecting each of the components of the article of footwear 300.

In some embodiments, one or more portions of the article of footwear 300 can be formed within a cavity of another one of the portions of the article of footwear 300. For example, in some embodiments the first midfoot portion 1367 can be formed within a cavity of the midsole portion 1363 during an additive manufacturing process. In some embodiments, the second midfoot portion 1369 can be formed within a cavity of the midsole portion 1363 during an additive manufacturing process. In some embodiments, the upper portion 336 can be formed within a cavity of the midsole portion 1363 during an additive manufacturing process. In some embodiments, any of the portions of the article of footwear 300 formed within a cavity of another portion of the article of footwear 300 (for example, the midsole portion 1363) can be connected with one or more of the supports 1371 in the cavity.

In some embodiments, two or more portions of the article of footwear 300 can be formed nested within each other. For example, in some embodiments the first midfoot portion 1367 can be formed within a cavity of the second midfoot portion 1369, and the second midfoot portion 1369 can be formed within a cavity of the midsole portion 1363, during an additive manufacturing process. In some embodiments, any of the nested portions of the article of footwear 300 can be connected to other nested portions with one or more of the supports 1371.

After the components are formed, each support 1371 can be removed to disconnect the components of the article of footwear 300. After removal of the supports 1371, the components of the article of footwear 300 can be assembled as described herein.

Figure 14:
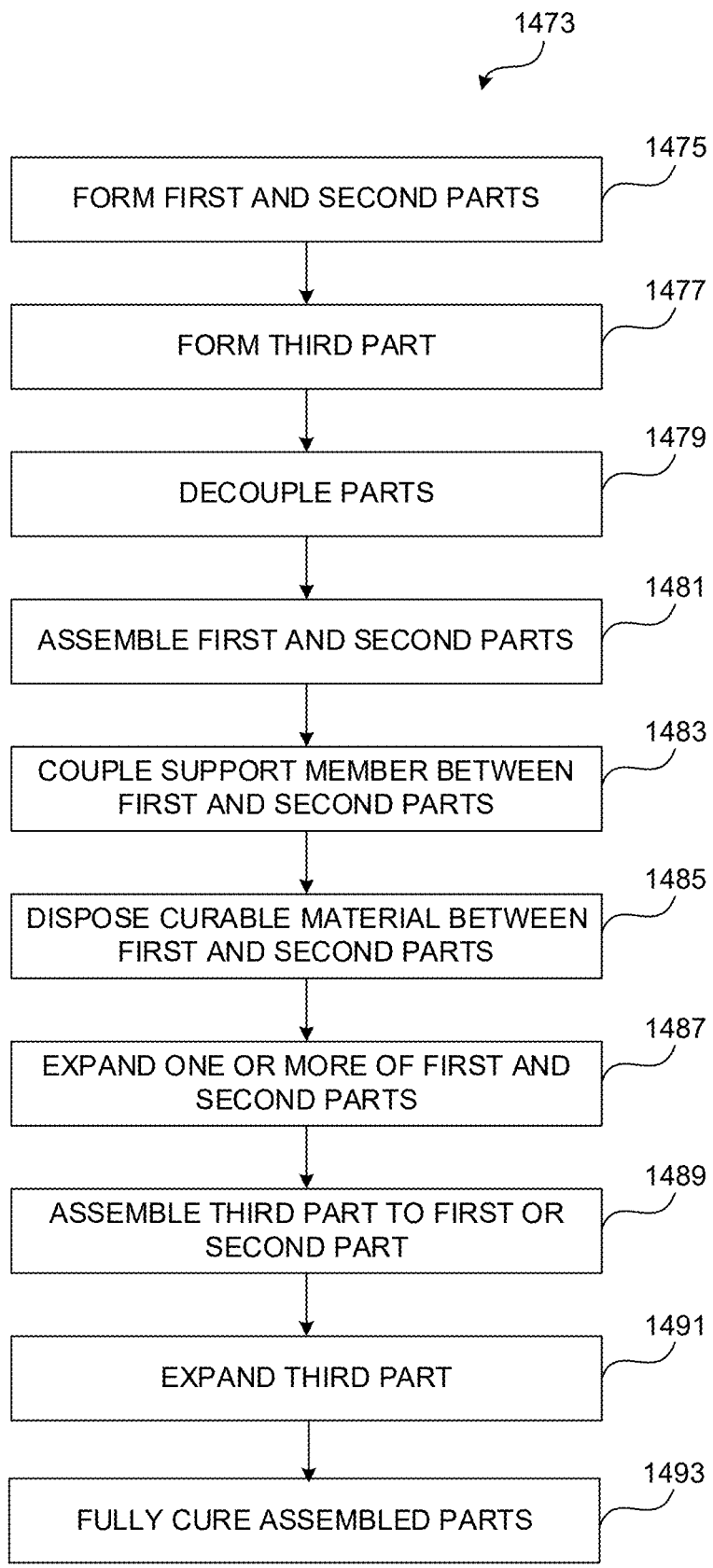
FIG. 14 shows a flowchart for a method of manufacturing an article of footwear according to some embodiments.

FIG. 14 shows a flowchart for a method 1473 of manufacturing an article of footwear according to some embodiments. Unless stated otherwise, the steps of method 1473 need not be performed in the order set forth herein. Additionally, unless specified otherwise, the steps need not be performed sequentially. The steps can be performed in a different order or simultaneously. For example, step 1483 can be performed before, after, or concurrently with step 1481. Further, method 1473 may not comprise all the steps illustrated in FIG. 14. For example, method 1473 may not comprise forming, decoupling, and assembling a third part in steps 1477 and 1479.

In some embodiments, the article of footwear can be any of the articles of footwear described herein. For example, the article of footwear for the method 1473 can be the article of footwear 100, the article of footwear 300, the article of footwear 400, the article of footwear 754, the article of footwear 760, the article of footwear 770, the article of footwear 900, the article of footwear 1000, or the article of footwear 1100. Some or all of the articles of footwear described herein may be referenced when describing the method 1473.

At step 1475, first and second parts are formed. For example, the first and second parts can be formed using any of the additive manufacturing processes described herein. In some embodiments, the first and second parts formed in step 1475 can be formed in a green state using any of the additive manufacturing processes described herein. More specifically, the first and second parts can be any combination of an upper portion, a midsole portion, an outsole portion, a support member, an insert, or a tongue portion. In some embodiments, the first and second parts can be formed at the same time and separate from each other. In some embodiments, the first and second parts can be formed at the same time and can be connected by one or more supports. In some embodiments, the first and second parts can be formed in the green state. In some embodiments, the first and second parts can be formed in the final state. In some embodiments, step 1475 can comprise forming the first part and the second part with the same material. In some embodiments, step 1475 can comprise forming the first part with a first material and forming the second part with a second material different from the first material.

In embodiments comprising one or more parts made using a three-dimensional printing process in method 1473, one or more of the parts can be built on a flat build surface. As a result, a surface of the one or more parts comprises a planar surface built on the flat build surface. In some embodiments, multiple parts can each comprise a planar surface built on a flat build surface.

As used herein, the term "planar surface" means the surface that has an exterior surface profile having at least 30% of the surface's area lying on a single, flat plane. In some embodiments, an exterior surface profile can have at least 50% of the surface's area lying on a single, flat plane. A planar surface having an exterior surface profile with at least 30% of the surface's area lying on a single, flat plane can facilitate three-dimensional printing of one or more parts by ensuring sufficient contact between the printed part and the build surface during printing.

For example, in some embodiments, surfaces of one or more protruding connectors as described herein can comprise a planar surface built on a build plate. Similarly, in some embodiments, a mating surface in which one or more corresponding connectors are formed (e.g., in the form of a recess or slot) can comprise a planar surface built on a build plate. As such, the corresponding connectors can connect two surfaces each having a planar surface to create a non-planar footwear configuration. In such embodiments, this connection between the two planar surfaces can provide design freedom for other surfaces of a part.

For example, a bottom surface of the sole portion 103 or midsole portion 104 can be formed with a non-planar surface. A bottom surface comprising a non-planar surface can facilitate formation of unique traction features on the bottom surface not achievable if the bottom surface was built on the build plate. In some embodiments, the bottom surface comprising a non-planar surface can comprise integrally formed tread or traction elements to improve the traction between the sole portion 103 and the ground. In some embodiments, the traction elements can be formed by printing the bottom surface to incorporate non-planar elements such as bumps, grooves, recesses, ridges, and similar structures. In some embodiments, an outsole potion 106 can be coupled to the traction elements formed on the bottom surface of a midsole portion 104.

As another example, a top-most surface on the upper portion 102 can be formed with a non-planar surface comprising bumps, grooves, recesses, ridges, and similar structures that provide unique structures on the top-most surface not achievable if the top-most surface was built on the build plate.

At step 1477, a third part can be formed. Similar to the first part and the second part, the third part can be any one of an upper portion, a midsole portion, an outsole portion, a support member, an insert, or a tongue portion. In some embodiments, the third part can be formed at the same time as the first and second parts. In some embodiments, the third part can be formed using the same additive manufacturing process used to form the first and second parts. In some embodiments, the third part can be formed at the same time as the first part and the second part and separate from the first part and the second part. In some embodiments, the third part can be formed at the same time as the first part and the second part and can be connected to one or more of the first part and the second part by one or more supports.

At step 1479, two or more parts formed together in steps 1475 and 1477 can be decoupled from each other. For example, the first part and the second part can be decoupled from each other. As another example, the third part can be decoupled from the first part and/or the second part. In some embodiments, the parts can be decoupled by removing the support(s) connecting the parts. In embodiments wherein parts are formed separately without one or more supports, method 1473 can skip to step 1479.

At step 1481, the first part and the second part are assembled. In some embodiments, opposing surfaces of the first part and the second part are mated by engaging respective connectors of the first part and the second part with each other as described herein.

At step 1483, a support member can be coupled between the first part and the second part. In some embodiments, step 1483 can comprise inserting the support member between the first part and the second part. For example, a support member can be inserted into a recess or channel defined by the first part and/or the second part. In some embodiments, one or more curved support members can be inserted into a recess or channel defined by the first part and/or the second part in green state to impart a curved shape to the first part and/or the second part. In some embodiments, step 1481 can occur prior to step 1483. In some embodiments, step 1483 can occur before step 1481. In some embodiments, method 1473 can omit step 1483.

At step 1485, a curable resin can be disposed between the first part and the second part. For example, a curable resin can be disposed at joint 334 between the first part and the second part. In some embodiments, step 1481 can occur prior to step 1485. In some embodiments, step 1485 can occur prior to step 1481. In some embodiments, step 1485 and step 1481 can occur sequentially or concurrently. In some embodiments, method 1473 can omit step 1485.

In some embodiments, step 1485 can comprise disposing the curable resin between the first part and the second part when the first part and the second part are in a green state. In some embodiments, step 1485 can comprise at least partially curing the curable resin. In some embodiments, the curable resin comprises a material that is the same as the material forming at least one of the first part or the second part. In some embodiments, step 1485 can comprise at least partially curing the curable resin with the application of heat. In some embodiments, step 1485 can comprise at least partially curing the curable resin at a temperature ranging from greater than or equal to 110° C. to less than or equal to 120° C. In some embodiments, step 1485 can comprise at least partially curing the curable resin at a temperature less than the temperature applied in expansion step 1487.

At step 1487, one or more of the first or second parts can be expanded. In some embodiments, the first part and/or the second part can be expanded by exposing the first part and the second part to heat (for example, placing the assembled first part and second part in an oven, directing heat from a heat gun at the assembled first part and second part, etc.). In some embodiments, the curable resin can at least partially cure during the heating of the first part and the second part. In some embodiments, the expansion of the first part and/or the second part can be directed by a support member (for example support members 1251 and/or 1257). For example, the first part and/or the second part can expand along a path defined by a support member such that the support member can impart a shape to the first part and/or the second part. In some embodiments, expansion of the first part and/or the second part can be constrained by one or more support members to impart a shape to the first part and/or the second part. In some embodiments, step 1485 and step 1487 can be performed simultaneously. In some embodiments, method 1473 can omit step 1487.

In some embodiments, step 1487 can comprise heating the first part and/or the second part to a temperature ranging from greater than or equal to 110° C. to less than or equal to 120° C. Expanding the first part and/or the second part in step 1487 comprises increasing the volume of the first part and/or the second part. In some embodiments, the volume of the first part and/or the second part can be increased by at least 10%, by at least 20%, or by at least 50%. In some embodiments, step 1487 can comprise at least partially curing the curable resin at a temperature ranging from greater than or equal to 110° C. to less than or equal to 120° C.

At step 1489, the third part can be assembled to the assembly of the first part and the second part. In some embodiments, opposing surfaces of the third part and one of the first part or the second part are mated by engaging respective connectors of the third part and the one of the first part or the second part with each other. In some embodiments, curable resin can be disposed between the third part and the one of the first part or the second part during assembly. In some embodiments, a support member can be inserted between the third part and the one of the first part or the second part during assembly.

At step 1491, the third part can be expanded. In some embodiments, the third part can be expanded by exposing the third part to heat (for example, placing the assembled third part in an oven, directing heat from a heat gun at the assembled third part, etc.). In some embodiments, the curable resin applied in step 1489 can at least partially cure during the heating of the third part. In some embodiments, the expansion of the third part can be directed by a support member (for example support members 1251 and/or 1257). For example, the third part can expand along a path defined by a support member such that the support member can impart a shape to the third part. In some embodiments, expansion of the third part can be constrained by one or more support members to impart a shape to the third part. In some embodiments, step 1485 and step 1491 can be performed simultaneously. In some embodiments, method 1473 can omit step 1491.

In some embodiments, step 1491 can comprise heating the third part to a temperature ranging from greater than or equal to 110° C. to less than or equal to 120° C. Expanding the third part in step 1491 comprises increasing the volume of the third part. In some embodiments, the volume of the third part can be increased by at least 10%, by at least 20%, or by at least 50%. In some embodiments, step 1491 can comprise at least partially curing the curable resin applied in step 1489 at a temperature ranging from greater than or equal to 110° C. to less than or equal to 120° C.

After assembling the parts, and optionally expanding the parts, the assembled parts can be fully cured in step 1493. In some embodiments, the assembled parts can be heated to a temperature ranging from greater than or equal to 100° C. to less than or equal to 130° C. to fully cure the parts in a final connected shape. In some embodiments, the assembled parts can be heated to a temperature ranging from greater than or equal to 100° C. to less than or equal to 120° C. to fully cure the parts in a final connected shape. In some embodiments, the parts can be fully cured in step 1493 before being assembled.

Embodiments described herein provide for articles of footwear that allow the wearer to customize various portions of the article of footwear for comfort, performance, and/or aesthetics. For example, a wearer can choose components made of materials that can provide the desired athletic performance. Additionally, a wearer can choose components made of materials or sizes that can provide a desired comfort. Furthermore, a wearer can choose components that have certain colors, designs, logos, etc., to personalize and customize the article of footwear. Embodiments described herein allow for a manufacturer to mass produce these customized articles of footwear without sacrificing efficiency or economies of scale.

While various embodiments have been described herein, they have been presented by way of example, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but can be interchanged to meet various situations as would be appreciated by one of skill in the art.

The examples are illustrative, but not limiting, of the present disclosure. Other suitable modifications and adaptations of the variety of conditions and parameters normally encountered in the field, and which would be apparent to those skilled in the art, are within the spirit and scope of the disclosure.

It is to be understood that the phraseology or terminology used herein is for the purpose of description and not of limitation. The breadth and scope of the present disclosure should not be limited by any of the above-described exemplary embodiments, but should be defined in accordance with the following claims and their equivalents.

What is claimed is:

1. An article of footwear, comprising:
    a first part having a first surface;
    a second part having a second surface opposing the first surface and a third surface opposing the second surface;
    a first connector that couples the first part to the second part, the first connector being integrally formed with the first part;
    a second connector that couples the second part to the first part, the second connector being integrally formed with the second part;
    a third part comprising a fourth surface opposing the third surface;
    a third connector that couples the third part to the second part, the third connector being integrally formed with the third part; and
    a fourth connector that couples a fourth part to the third part, the fourth connector being integrally formed with the fourth part;
    wherein the first surface and the second surface are mated by the first connector and the second connector, and
    wherein the third surface and the fourth surface are mated by the third connector and the fourth connector.

2. The article of footwear of claim 1, wherein the first connector extends from the first surface and the second connector is recessed from the second surface, and the first connector engages the second connector to mate the first surface and the second surface.

3. The article of footwear of claim 2, wherein the first connector comprises a tab extending from the first surface and the second connector comprises a slot, and the tab engages with the slot to mate the first surface and the second surface.

4. The article of footwear of claim 1, wherein the first part comprises one of a footwear upper portion or a midsole portion, and the second part comprises the other of the footwear upper portion or the midsole portion.

5. The article of footwear of claim 1, wherein the first part comprises one of a footwear upper portion or a tongue portion, and the second part comprises the other of the footwear upper portion or the tongue portion.

6. The article of footwear of claim 5, wherein the tongue portion defines a first plurality of openings and the footwear upper portion defines a second plurality of openings, and wherein a shoelace extends through the first plurality of openings and the second plurality of openings to couple the tongue portion to the footwear upper portion.

7. The article of footwear of claim 1, wherein the first part comprises one of a footwear upper portion or an insert, and the second part comprises the other of the footwear upper portion or the insert.

8. The article of footwear of claim 1, wherein at least one of the first part or the second part is formed by an additive manufacturing process and comprises a three-dimensional mesh comprising a plurality of unit cells, each unit cell comprising a plurality of unit cell struts defining a three-dimensional structure and a plurality of nodes at which one or more unit cell struts are connected.

9. The article of footwear of claim 1, wherein at least one of the first part or the second part is a single piece.

10. The article of footwear of claim 1, further comprising a support member located between the first part and the second part, the support member coupled to the first part and the second part.

11. The article of footwear of claim 10, wherein the support member defines an aperture that receives at least one of the first connector or the second connector.

12. The article of footwear of claim 10, wherein the support member comprises a third connector integrally formed with the support member, the third connector coupling the support member to at least one of the first part or the second part.

13. The article of footwear of claim 1, wherein engagement between the first connector and the second connector creates an interlocking fit at a joint between the first part and the second part, and wherein the joint between the first part and the second part comprises a cured resin.

14. The article of footwear of claim 13, wherein the cured resin comprises a first material, and at least one of the first part or the second part is formed from the first material.

15. A method of making an article of footwear, comprising:
- assembling a first part to a second part such that a first surface of the first part opposes a second surface of the second part, the first part comprising a first connector integrally formed with the first part, the second part comprising a second connector integrally formed with the second part, wherein assembling the first part to the second part causes the first connector to engage the second connector to mate the first surface and the second surface;
- assembling a third part to the second part such that a third surface of the third part opposes a fourth surface of the second part, the third part comprising a third connector integrally formed with the third part, and the second part comprising a fourth connector integrally formed with the second part, wherein assembling the third part to the second part causes the third connector to engage the fourth connector to mate the third surface and the fourth surface; and
- assembling a fourth part to the third part such that the fourth part is located between the third part and the second part, the fourth part comprising a fifth connector integrally formed with the fourth part, wherein assembling the fourth part to the third part causes the third connector to engage the fifth connector.

16. An article of footwear, comprising:
- an upper having a first surface;
- a midsole having a second surface opposing the first surface and a third surface opposing the second surface;
- a first connector that couples the upper to the midsole, the first connector being integrally formed with the upper;
- a second connector that couples the midsole to the upper, the second connector being integrally formed with the midsole;
- an outsole comprising a fourth surface opposing the third surface; and
- a third connector that couples the outsole to the midsole, the third connector being integrally formed with the outsole;
- wherein the first surface and the second surface are mated by the first connector and the second connector, and the third surface and the fourth surface are mated by the third connector,
- wherein the outsole covers a forefoot portion and a rearfoot portion of the article of footwear.

17. The article of footwear of claim 16, wherein the outsole is longer than the midsole in a forefoot-rearfoot direction.

* * * * *